US011139693B2

(12) United States Patent
Nakao et al.

(10) Patent No.: US 11,139,693 B2
(45) Date of Patent: Oct. 5, 2021

(54) CONTACTLESS POWER TRANSMISSION APPARATUS

(71) Applicant: OMRON Corporation, Kyoto (JP)

(72) Inventors: Goro Nakao, Inazawa (JP); Yusuke Kawai, Ichinomiya (JP); Atsushi Nomura, Ichinomiya (JP); Toshiyuki Zaitsu, Yokohama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/970,644

(22) PCT Filed: Jan. 18, 2019

(86) PCT No.: PCT/JP2019/001547
§ 371 (c)(1),
(2) Date: Aug. 18, 2020

(87) PCT Pub. No.: WO2019/171786
PCT Pub. Date: Sep. 12, 2019

(65) Prior Publication Data
US 2021/0013742 A1 Jan. 14, 2021

(30) Foreign Application Priority Data
Mar. 6, 2018 (JP) .............................. JP2018-039730

(51) Int. Cl.
*H02J 50/12* (2016.01)
*H02J 50/80* (2016.01)
(52) U.S. Cl.
CPC ............. *H02J 50/12* (2016.02); *H02J 50/80* (2016.02)
(58) Field of Classification Search
CPC .................................. H02J 50/12; H02J 50/80
See application file for complete search history.

(56) References Cited

U.S. PATENT DOCUMENTS 6,037,745 A * 3/2000 Koike ..................... B60L 53/31
320/104
2014/0239728 A1 8/2014 Yamakawa et al.
(Continued)

FOREIGN PATENT DOCUMENTS

JP 2010-136464 A 6/2010
JP 2012-217228 A 11/2012
(Continued)

OTHER PUBLICATIONS

English translation of the International Search Report ("ISR") of PCT/JP2019/001547 dated Apr. 9, 2019.
Written Opinion("WO") of PCT/JP2019/001547 dated Apr. 9, 2019.

*Primary Examiner* — Hal Kaplan
*Assistant Examiner* — Joseph N Inge
(74) *Attorney, Agent, or Firm* — Metroplex IP Law Group, PLLC

(57) ABSTRACT

A contactless power transmission apparatus includes a receiver that includes a resonant circuit that receives electric power from a transmitter. The receiver causes, in response to a measurement value of an output voltage of electric power output from the resonant circuit being out of a predetermined allowable range of voltages, a short circuit to short-circuit the resonant circuit and transmits determination information indicating that the contactless power transmission apparatus is not outputting a constant voltage. In response to the determination information, the transmitter in the contactless power transmission apparatus detects a switching frequency of alternating current power to be supplied to a transmitter coil from a power supply circuit at which the contactless power transmission apparatus outputs a constant voltage in accordance with a measurement value of a current through the transmitter coil.

15 Claims, 13 Drawing Sheets

(56) References Cited

U.S. PATENT DOCUMENTS

| | | | |
|---|---|---|---|
| 2015/0236518 A1* | 8/2015 | Matsumoto | H02J 7/025 |
| | | | 307/104 |
| 2016/0114688 A1 | 4/2016 | Koizumi et al. | |
| 2018/0090995 A1* | 3/2018 | Arasaki | B60L 53/122 |
| 2019/0148979 A1* | 5/2019 | Goeldi | G01R 25/00 |
| | | | 307/104 |

FOREIGN PATENT DOCUMENTS

| | | |
|---|---|---|
| JP | 2015-12748 A | 1/2015 |
| JP | 2015-149803 A | 8/2015 |
| JP | 2017-5790 A | 1/2017 |

\* cited by examiner

Fig. 6
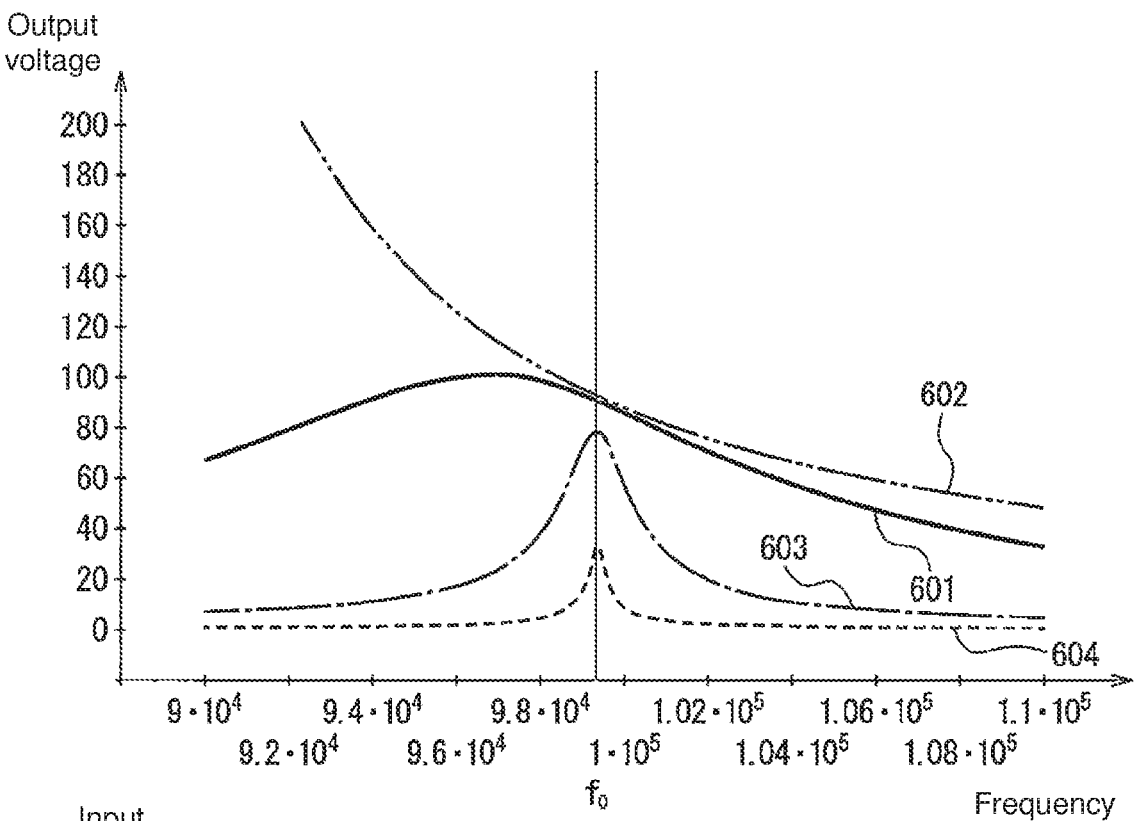
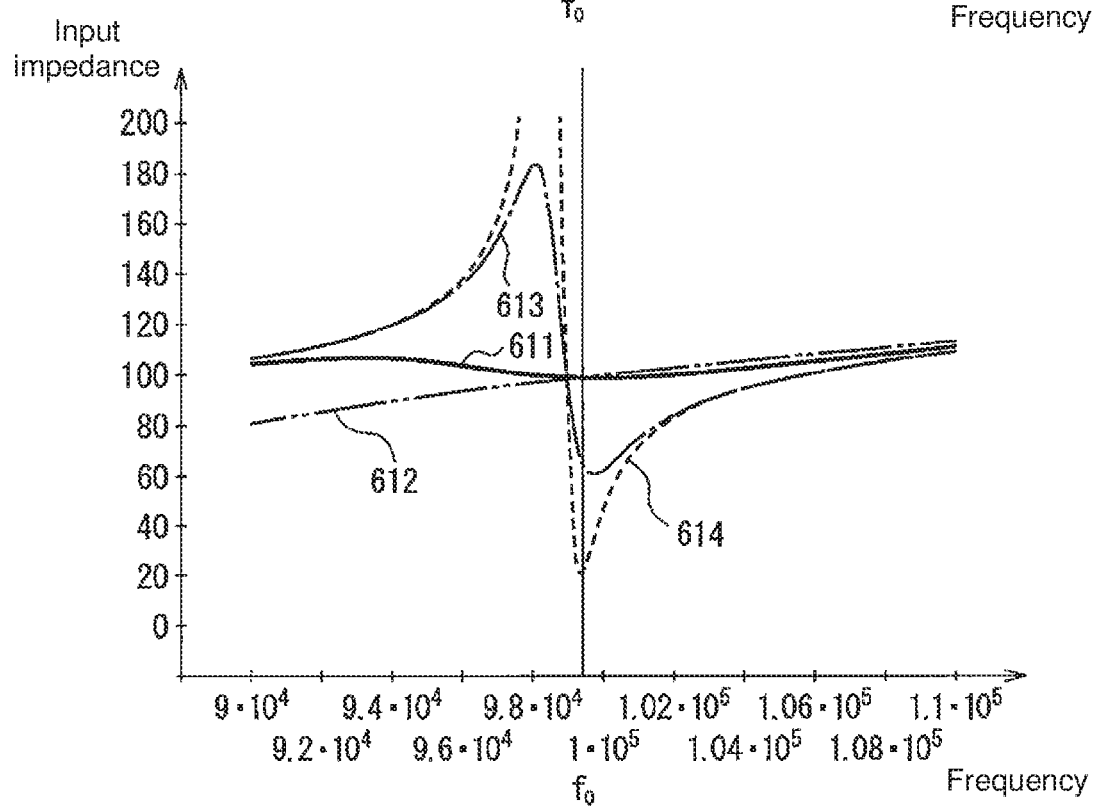

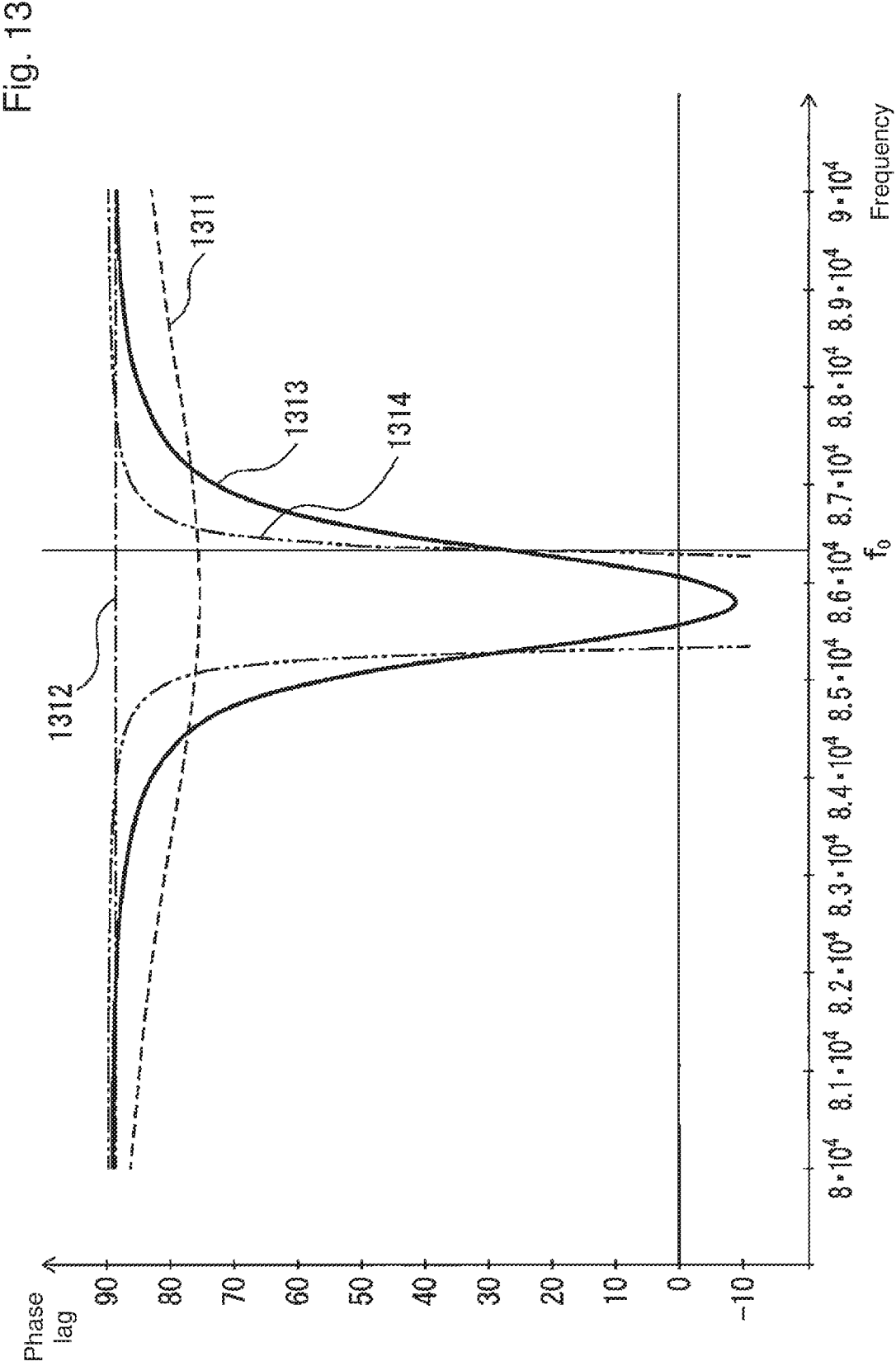

CONTACTLESS POWER TRANSMISSION APPARATUS

FIELD

The present invention relates to a contactless power transmission apparatus.

BACKGROUND

Techniques have been studied for contactless power transmission (also called as wireless power transmission) or transmitting electric power through space without using metal contacts or other connections.

In contactless power transmission, the frequency of alternating current (AC) power applied to a transmitter coil to achieve high power transmission efficiency varies in accordance with the degree of coupling between the transmitter coil on a primary end (transmitter end) and a receiver coil on a secondary end (receiver end). The degree of coupling between the transmitter coil and the receiver coil varies in accordance with the positional relationship between the two coils. A technique is thus developed to easily and correctly obtain a frequency response corresponding to the frequency response of the transmission efficiency simply through processing on the transmitter end (refer to, for example, Patent Literature 1).

A power transmission apparatus described in Patent Literature 1 supplies alternating current (AC) power to a transmitter coil at a constant voltage or with a constant current while varying the drive frequency of an inverter. The power transmission apparatus then obtains the frequency response of a current value associated with a current through the transmitter coil receiving AC power or a voltage value associated with a voltage applied to the transmitter coil.

CITATION LIST

Patent Literature

Patent Literature 1: Japanese Unexamined Patent Application Publication No. 2015-12748

SUMMARY

Technical Problem

Contactless power transmission apparatuses may perform a constant voltage output operation for enabling a receiver end to output a constant voltage. Electronic devices are typically controlled with a constant voltage. Thus, a contactless power transmission apparatus is to supply a constant voltage to a load circuit.

Although the technique described in Patent Literature 1 can determine, on the transmitter end, the frequency of AC power to be applied to the transmitter coil to achieve high power transmission efficiency, that frequency may differ from the frequency at which the contactless power transmission apparatus outputs a constant voltage. Additionally, the frequency of AC power to be applied to the transmitter coil at which the contactless power transmission apparatus outputs a constant voltage varies in accordance with the degree of coupling between the transmitter coil and the receiver coil. Thus, the frequency of AC power to be applied to the transmitter coil at which the contactless power transmission apparatus outputs a constant voltage is to be determined.

One or more aspects of the present invention are directed to a contactless power transmission apparatus that can correctly detect the frequency of AC power to be applied to the transmitter coil at which a constant voltage is output.

Solution to Problem

A contactless power transmission apparatus according to one aspect of the present invention includes a transmitter and a receiver that receives electric power from the transmitter in a contactless manner. The transmitter includes a transmitter coil that supplies electric power to the receiver, a power supply circuit that supplies alternating current power having an adjustable switching frequency and an adjustable voltage to the transmitter coil, a current detection circuit that measures a current through the transmitter coil and determines a measurement value of the current, a control circuit that controls the switching frequency and the voltage of the alternating current power to be supplied to the transmitter coil from the power supply circuit, and a first communicator that communicates with the receiver. The receiver includes a resonant circuit including a receiver coil that receives electric power from the transmitter and a resonant capacitor that resonates with the receiver coil in response to electric power from the transmitter, a rectifier circuit that rectifies electric power output from the resonant circuit, a short circuit that switches between short-circuiting and opening the resonant circuit, a voltage detection circuit that measures an output voltage of electric power output from the resonant circuit and determines a measurement value of the output voltage, a second communicator that communicates with the transmitter, and a determination circuit that determines whether the measurement value of the output voltage is within a predetermined allowable range of voltages, and causes the short circuit to short-circuit the resonant circuit and causes the second communicator to transmit determination information indicating that the contactless power transmission apparatus is not outputting a constant voltage in response to the measurement value of the output voltage being out of the predetermined allowable range of voltages. The control circuit in the transmitter detects, in response to the determination information indicating that the contactless power transmission apparatus is not outputting a constant voltage received from the receiver through the first communicator, a switching frequency of the alternating current power at which the contactless power transmission apparatus outputs a constant voltage in accordance with the measurement value of the current. The contactless power transmission apparatus with the above structure can correctly detect the frequency of AC power to be applied to the transmitter coil at which a constant voltage is output.

In the contactless power transmission apparatus, the receiver may further include a coil connected in series to the receiver coil between the resonant circuit and the rectifier circuit. The receiver coil and the resonant capacitor in the resonant circuit in the receiver may be connected in parallel. The short circuit in the receiver may have an end connected between the coil connected in series to the receiver coil and the rectifier circuit. The determination circuit in the receiver may cause the short circuit to short-circuit the resonant circuit through the coil connected in series to the receiver coil in response to the measurement value of the output voltage being out of the predetermined allowable range of voltages.

The contactless power transmission apparatus with the above structure can correctly detect the frequency of AC power to be applied to the transmitter coil at which a constant voltage is output.

In the contactless power transmission apparatus, the receiver coil and the resonant capacitor in the resonant circuit in the receiver coil may be connected in series.

The contactless power transmission apparatus with the above structure can have higher power transmission efficiency at a lower output voltage.

In the contactless power transmission apparatus, the control circuit in the transmitter may determine that the contactless power transmission apparatus outputs a constant voltage at a switching frequency of the alternating current power at which the measurement value of the current is greater than or equal to a predetermined threshold.

The contactless power transmission apparatus with the above structure can correctly detect the frequency of AC power to be applied to the transmitter coil at which a constant voltage is output.

In the contactless power transmission apparatus, the control circuit in the transmitter may determine that the contactless power transmission apparatus outputs a constant voltage at a switching frequency of the alternating current power at which an absolute value of a difference between a phase of the measurement value of the current and a phase of the voltage of the alternating current power to be supplied to the transmitter coil is less than or equal to a predetermined threshold. The contactless power transmission apparatus with the above structure can correctly detect the frequency of AC power to be applied to the transmitter coil at which a constant voltage is output.

In the contactless power transmission apparatus, the control circuit in the transmitter may cause, after detecting the switching frequency of the alternating current power at which the contactless power transmission apparatus outputs a constant voltage, the first communicator to transmit detection information indicating the detection of the switching frequency. The determination circuit in the receiver may cause the short circuit to open the resonant circuit after receiving the detection information through the second communicator.

The contactless power transmission apparatus with the above structure can resume power supply to a load circuit in a timely manner.

In this case, the control circuit in the transmitter may control, after causing the first communicator to transmit the detection information, the power supply circuit to regulate the voltage of the alternating current power to be supplied to the transmitter coil to a voltage at which the contactless power transmission apparatus outputs a constant voltage.

The contactless power transmission apparatus with the above structure can resume a constant voltage output operation.

BRIEF DESCRIPTION OF THE DRAWINGS

FIG. 6 includes graphs showing an example relationship between the frequency response of the output voltage and the frequency response of the input impedance in the contactless power transmission apparatus.

FIG. 13 is a graph showing an example relationship between the frequency response of the output voltage from the contactless power transmission apparatus including the transmitter shown in FIG. 1 and the receiver shown in FIG. 10 and the frequency response of a phase lag of the current relative to the voltage of the AC power applied to the transmitter coil.

DETAILED DESCRIPTION

A contactless power transmission apparatus according to one embodiment of the present invention will now be described with reference to the drawings. The contactless power transmission apparatus can output a constant voltage based on the same structure as the SPL topology including a reactor connected in series to a receiver coil that resonates in parallel with a resonant capacitor. The contactless power transmission apparatus uses resonance on the receiver end to transmit power, without using resonance on the transmitter end, and thus without lowering power transmission efficiency at a low degree of coupling between a transmitter coil and the receiver coil.

For this contactless power transmission apparatus, the inventors of the present application have noticed that a current through the transmitter coil reaches the maximum at the frequency of alternating current (AC) power to be applied to the transmitter coil at which the contactless power transmission apparatus outputs a constant voltage when a load circuit connected to a resonant circuit on the receiver end has a very small, negligible impedance. The inventors have also noticed that the voltage of the AC power has the same phase as the current through the transmitter coil.

When the contactless power transmission apparatus can no longer output a constant voltage due to, for example, a change in the positional relationship between the transmitter coil and the receiver coil, the apparatus short-circuits the resonant circuit on the receiver end through a coil connected in series to the receiver coil in the resonant circuit. The contactless power transmission apparatus then measures the current through the transmitter coil while varying the frequency of the AC power to be applied to the transmitter coil. The contactless power transmission apparatus detects the frequency at which the measurement value of the current reaches the maximum or the voltage applied to the transmitter coil has the same phase as the current through the transmitter coil. The apparatus then applies AC power with the detected frequency to the transmitter coil to output a constant voltage.

Figure 1:
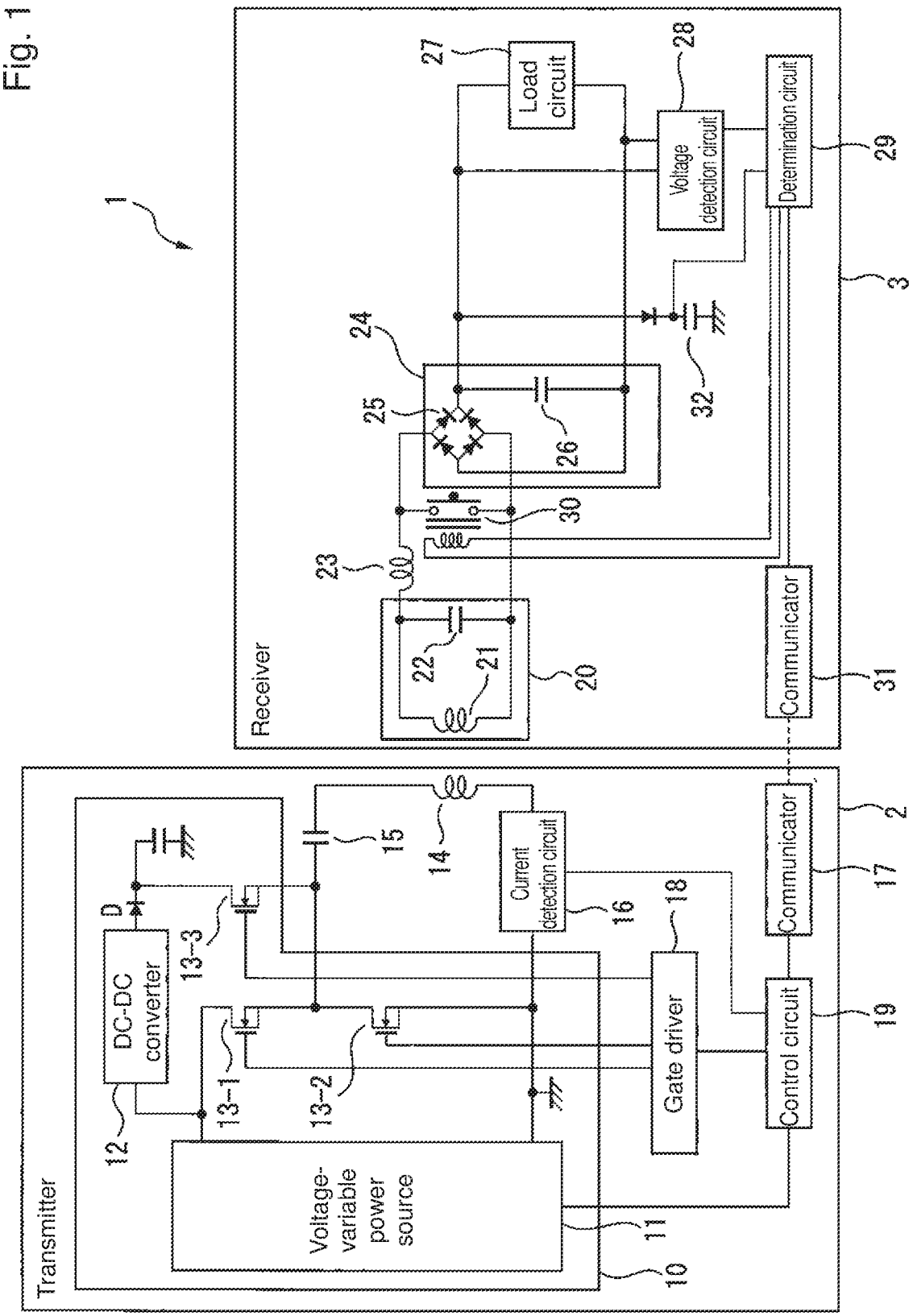
FIG. 1 is a schematic diagram of a contactless power transmission apparatus according to one embodiment of the present invention.

FIG. 1 is a schematic diagram of a contactless power transmission apparatus according to one embodiment of the present invention. As shown in FIG. 1, a contactless power transmission apparatus 1 includes a transmitter 2, and a receiver 3 for receiving power from the transmitter 2 through space in a contactless manner. The transmitter 2 includes a power supply circuit 10, a transmitter coil 14, a capacitor 15, a current detection circuit 16, a communicator 17, a gate driver 18, and a control circuit 19. The receiver 3 includes a resonant circuit 20 including a receiver coil 21 and a resonant capacitor 22, a coil 23, a rectifier-smoothing circuit 24 including a full wave rectifier circuit 25 and a smoothing capacitor 26, a load circuit 27, a voltage detection circuit 28, a determination circuit 29, a relay 30, a communicator 31, and a charge storage circuit 32.

The power supply circuit 10 supplies AC power having an adjustable switching frequency and an adjustable voltage to the transmitter coil 14. The power supply circuit 10 thus includes a voltage-variable power source 11, a DC-DC converter 12, and three switching elements 13-1 to 13-3.

The voltage-variable power source 11 supplies direct current (DC) power having a voltage adjustable by the control circuit 19. The voltage-variable power source 11 may include any one of circuit designs enabling adjustment of supplying voltage. While the contactless power transmission apparatus 1 is outputting a constant voltage, the DC power supplied from the voltage-variable power source 11 is converted into AC power through the switching elements 13-1 and 13-2 before being supplied to the transmitter coil 14. While the switching frequency is being adjusted to enable the contactless power transmission apparatus 1 to output a constant voltage, the DC power supplied from the voltage-variable power source 11 is supplied to the transmitter coil 14 through the DC-DC converter 12 and the switching element 13-3.

The DC-DC converter 12 has an input terminal connected to a positive electrode terminal of the voltage-variable power source 11 and an output terminal connected to one end of the capacitor 15 through a diode D and the switching element 13-3. The DC-DC converter 12 lowers the voltage of the DC power supplied from the voltage-variable power source 11 to a predetermined voltage (e.g., 5 V).

While the switching frequency is being adjusted to enable the contactless power transmission apparatus 1 to output a constant voltage, the voltage output from the DC-DC converter 12 is supplied to the transmitter coil 14 through the diode D, the switching element 13-3, and the capacitor 15.

The switching elements 13-1 to 13-3 are, for example, n-channel metal-oxide-semiconductor field-effect transistors (MOSFETs). The switching elements 13-1 and 13-2 are connected in series between the positive electrode terminal and the negative electrode terminal of the voltage-variable power source 11. The voltage-variable power source 11 has a positive electrode end connected to the switching element 13-1 and a negative electrode end connected to the switching element 13-2. The switching element 13-1 has a drain terminal connected to the positive electrode terminal of the voltage-variable power source 11 and a source terminal connected to the drain terminal of the switching element 13-2. The source terminal of the switching element 13-1 and the drain terminal of the switching element 13-2 are connected to one end of the transmitter coil 14 through the capacitor 15. The source terminal of the switching element 13-2 is connected to the negative electrode terminal of the voltage-variable power source 11 and to the other end of the transmitter coil 14 through the current detection circuit 16.

The switching element 13-3 has a drain terminal connected to the output terminal of the DC-DC converter 12 and a source terminal connected to the one end of the transmitter coil 14 through the capacitor 15. The switching elements 13-1 to 13-3 have their gate terminals connected to the gate driver 18.

The switching elements 13-1 to 13-3 are controlled by the control circuit 19 and turned on and off by the gate driver 18. The on-off control for the switching elements 13-1 to 13-3 will be described later.

The transmitter coil 14 transmits, through space, AC power supplied from the power supply circuit 10 to the resonant circuit 20 in the receiver 3.

The capacitor 15 is connected between the transmitter coil 14 and the power supply circuit 10. The capacitor 15 repeatedly charges and discharges in response to each switching element being turned on and off at the switching frequency, and supplies AC power having the switching frequency to the transmitter coil 14. To prevent the transmitter coil 14 and the capacitor 15 from operating as a resonant circuit in the adjustable switching frequency range, the capacitance of the capacitor 15 may be set to allow the transmitter coil 14 and the capacitor 15 to resonate at a frequency smaller than the resonance frequency of the resonant circuit 20 in the receiver 3 and smaller than the lower limit frequency in the adjustable switching frequency range.

The current detection circuit 16 is connected between the transmitter coil 14 and the power supply circuit 10 to measure a current through the transmitter coil 14. The current detection circuit 16 outputs the measurement value of the current to the control circuit 19. The current detection circuit 16 may be connected in parallel to the capacitor 15 to the transmitter coil 14 together with a diverting capacitor (not shown) connected in series to the current detection circuit 16. In this case, the current detection circuit 16 indirectly measures the current through the transmitter coil 14.

The communicator 17 extracts, from every radio signal received from the communicator 31 in the receiver 3, determination information indicating, for example, whether the contactless power transmission apparatus 1 is outputting a constant voltage, and outputs the information to the control circuit 19. The communicator 17 also generates a radio signal including detection information received from the control circuit 19 indicating that the switching frequency at which the contactless power transmission apparatus 1 outputs a constant voltage has been detected, and transmits the radio signal to the communicator 31 in the receiver 3. The communicator 17 thus includes, for example, an antenna that transmits and receives a radio signal complying with a predetermined wireless communication standard and a communication circuit that modulates a radio signal before transmission or demodulates a received radio signal. The predetermined wireless communication standard is, for example, ISO/IEC 15693, ZigBee (registered trademark), or Bluetooth (registered trademark).

The gate driver 18 receives, from the control circuit 19, a control signal for turning on and off each of the switching elements 13-1 to 13-3. In response to the control signal, the gate driver 18 varies the voltage to be applied to the gate terminal of each of the switching elements 13-1 to 13-3. More specifically, when receiving a control signal for turning on the switching element 13-1, the gate driver 18 applies a relatively high voltage to the gate terminal of the switching element 13-1 to turn on the switching element 13-1. When receiving a control signal for turning off the switching element 13-1, the gate driver 18 applies a relatively low voltage to the gate terminal of the switching element 13-1 to turn off the switching element 13-1. This allows the gate driver 18 to turn on and off the switching element 13-1 at timing specified by the control circuit 19. Similarly, the gate driver 18 turns on and off the switching elements 13-2 and 13-3 by changing a voltage applied to the gate terminals of the switching elements 13-2 and 13-3.

The control circuit 19 includes, for example, nonvolatile and volatile memory circuits, an arithmetic circuit, and an interface circuit for connection to another circuit. Upon every reception of determination information from the communicator 17, the control circuit 19 controls the switching frequency and the voltage of the AC power supplied from the power supply circuit 10 to the transmitter coil 14 in accordance with the determination information.

In the present embodiment, while the contactless power transmission apparatus 1 is outputting a constant voltage, the control circuit 19 outputs, to the gate driver 18, a control signal instructing to retain the off state of the switching element 13-3. The control circuit 19 also outputs, to the gate driver 18, a control signal instructing to alternately turn on and off the switching elements 13-1 and 13-2 at the switching frequency at which a constant voltage is output. More specifically, when the switching element 13-1 is on and the switching element 13-2 is off, a current flows through the transmitter coil 14 as the capacitor 15 charges the power supplied from the voltage-variable power source 11 through the switching element 13-1. When the switching element 13-1 is off and the switching element 13-2 is on, the capacitor 15 discharges, causing a current to flow through the transmitter coil 14.

The control circuit 19 controls the switching elements 13-1 and 13-2 to be alternately turned on for the same duration within one cycle corresponding to the switching frequency. To prevent the switching elements 13-1 and 13-2 from being turned on at the same time and short-circuiting the voltage-variable power source 11, the control circuit 19 may have dead time during which the switching elements 13-1 and 13-2 are both off when turning them on and off.

While the switching frequency is being adjusted to enable the contactless power transmission apparatus 1 to output a constant voltage, the control circuit 19 outputs, to the gate driver 18, a control signal instructing to retain the off state of the switching element 13-1 and alternately turn on and off the switching elements 13-3 and 13-2 at the switching frequency.

When the communicator 17 receives no radio signal from the receiver 3, the receiver 3 may be located outside the range for receiving power from the transmitter 2, or in other words, the transmitter 2 may be in a standby state. In this case, the control circuit 19 may set the voltage output from the voltage-variable power source 11 to its minimum possible value. During the standby state of the transmitter 2, the minimum possible voltage is applied to the transmitter coil 14 to reduce energy loss.

The control for the voltage and the switching frequency of AC power to be applied to the transmitter coil 14 to enable the contactless power transmission apparatus 1 to output a constant voltage will be described in detail later.

The receiver 3 will now be described.

The resonant circuit 20 is an LC resonant circuit including the receiver coil 21 and the resonant capacitor 22 connected in parallel to each other. The receiver coil 21 in the resonant circuit 20 has one end connected to one end of the resonant capacitor 22 and also to one input terminal of the rectifier-smoothing circuit 24 through the coil 23. The receiver coil 21 has the other end connected to the other end of the resonant capacitor 22 and also to the other input terminal of the rectifier-smoothing circuit 24.

The receiver coil 21 resonates with an AC flowing through the transmitter coil 14 in the transmitter 2 to receive power from the transmitter coil 14. The receiver coil 21 outputs the received power to the rectifier-smoothing circuit 24 through the resonant capacitor 22 and the coil 23. The receiver coil 21 and the transmitter coil 14 in the transmitter 2 may have the same number or different numbers of turns.

The resonant capacitor 22 has one end connected to one of the receiver coil 21 and to the coil 23, and the other end connected to the other end of the receiver coil 21 and to the rectifier-smoothing circuit 24. The resonant capacitor 22 outputs the power received by the receiver coil 21 to the rectifier-smoothing circuit 24 through the coil 23.

The coil 23 is connected between the resonant circuit 20 and the rectifier-smoothing circuit 24. In the present embodiment, the coil 23 has one end connected to the receiver coil 21 and the resonant capacitor 22 in the resonant circuit 20 to be in series to the receiver coil 21 and the other end connected to the rectifier-smoothing circuit 24. The coil 23 outputs power from the resonant circuit 20 to the rectifier-smoothing circuit 24. The coil 23 reduces harmonic components included in the received power in the same manner as in the SPL topology. The receiver coil 21 and the coil 23 may have the same number or different numbers of turns.

The rectifier-smoothing circuit 24, which is an example of a rectifier circuit, includes the full wave rectifier circuit 25 including four bridge-connected diodes and a smoothing capacitor 26. The rectifier-smoothing circuit 24 rectifies and smooths the power received through the resonant circuit 20 and output through the coil 23 to convert the power to DC power. The rectifier-smoothing circuit 24 outputs the resultant DC power to the load circuit 27.

The voltage detection circuit 28 measures the output voltage across the rectifier-smoothing circuit 24 at predetermined intervals. The output voltage across the rectifier-smoothing circuit 24 corresponds one-to-one to the output voltage of the resonant circuit 20. The measurement value of the output voltage across the rectifier-smoothing circuit 24 thus indirectly represents the measurement value of the output voltage of the resonant circuit 20. The voltage detection circuit 28 may be any of known voltage detection circuits that can detect a DC voltage. The voltage detection circuit 28 outputs a voltage detection signal representing the measurement value of the output voltage to the determination circuit 29.

The determination circuit 29 determines, based on the measurement value of the output voltage received from the voltage detection circuit 28, whether the contactless power transmission apparatus 1 is outputting a constant voltage and whether the measurement value of the output voltage is within the range of allowable voltages during a constant voltage output operation. The determination circuit 29 provides the determination result to the communicator 31. The determination circuit 29 thus includes, for example, a memory circuit that stores the allowable range of voltages and an arithmetic circuit that compares the measurement value of the output voltage with the allowable range of voltages.

While the measurement value of the output voltage is out of the allowable range of voltages, the determination circuit 29 turns on the relay 30 to short-circuit the two ends of the resonant circuit 20 through the coil 23, and retains the short-circuited state across the resonant circuit 20 until receiving, from the transmitter 2, detection information indicating that the switching frequency at which the contactless power transmission apparatus 1 outputs a constant voltage has been detected. The impedance of a circuit connected to the resonant circuit 20 decreases to a negligible value while the control circuit 19 in the transmitter 2 is adjusting the switching frequency and the voltage of the AC power to be applied to the transmitter coil 14 to enable the contactless power transmission apparatus 1 to output a constant voltage.

In response to the detection information received from the transmitter 2 through the communicator 31, the determination circuit 29 turns off the relay 30 and opens the two ends of the resonant circuit 20. This causes the impedance of the circuit connected to the resonant circuit 20 to be a value in accordance with the resistance of the load circuit 27. When the measurement value of the output voltage is within the allowable range of voltages, or more specifically, the contactless power transmission apparatus 1 is outputting a constant voltage, the determination circuit 29 retains the off state of the relay 30, or more specifically, retains the open state of the two ends of the resonant circuit 20. The determination circuit 29 provides, to the communicator 31, the determination result indicating that the measurement value of the output voltage is within the allowable range of voltages.

The relay 30 is an example of a short circuit. The relay 30 has one end connected between the coil 23 and one input terminal of the rectifier-smoothing circuit 24 and the other end connected between the resonant circuit 20 and the other input terminal of the rectifier-smoothing circuit 24. In the present embodiment, the relay 30, which is a normally-off relay, is turned on as controlled by the determination circuit 29. When the relay 30 is turned on, the resonant circuit 20 is short-circuited through the coil 23. The impedance of the circuit connected to the resonant circuit 20 decreases to a negligible value.

The communicator 31 generates, in accordance with the determination result from the determination circuit 29, a radio signal including determination information indicating whether the contactless power transmission apparatus 1 is outputting a constant voltage and whether the measurement value of the output voltage is within the allowable range of voltages at predetermined intervals. The communicator 31 then transmits the radio signal toward the communicator 17 in the transmitter 2. The communicator 31 receives the radio signal including detection information from the communicator 17 in the transmitter 2 and outputs the detection information to the determination circuit 29. The communicator 31 thus includes, for example, an antenna that transmits and receives a radio signal complying with a predetermined wireless communication standard and a communication circuit that modulates a radio signal before transmission and demodulates a received radio signal. As in the communicator 17, the predetermined wireless communication standard is, for example, ISO/IEC 15693, ZigBee (registered trademark), or Bluetooth (registered trademark).

The charge storage circuit 32 charges the power output through the rectifier-smoothing circuit 24. The charge storage circuit 32 supplies the determination circuit 29 with power to retain the on state of the relay 30. The charge storage circuit 32 thus includes, for example, a capacitor having one end connected to the positive electrode output terminal of the rectifier-smoothing circuit 24 through a diode for forward bias and the other end grounded. While the receiver 3 is receiving power from the transmitter 2, the capacitor in the charge storage circuit 32 charges the power output through the rectifier-smoothing circuit 24. When the contactless power transmission apparatus 1 is not outputting a constant voltage and the relay 30 is turned on to block the power output through the rectifier-smoothing circuit 24, the determination circuit 29 uses the power discharged from the capacitor in the charge storage circuit 32 to retain the on state of the relay 30.

The charge storage circuit 32 may include a circuit that can store power, other than a capacitor. For example, the charge storage circuit 32 may include a secondary battery in place of a capacitor. In this case, the power charged in the charge storage circuit 32 may be used to drive the determination circuit 29 and the communicator 31.

The operation of the contactless power transmission apparatus 1 will be described in detail.

In the present embodiment, the control circuit 19 in the transmitter 2 adjusts the switching frequency and the voltage of the AC power to be supplied to the transmitter coil 14 to enable the contactless power transmission apparatus 1 to output a constant voltage when the determination information received from the communicator 17 indicates that the measurement value of the output voltage is out of a predetermined allowable range or more specifically that the contactless power transmission apparatus 1 is not outputting a constant voltage.

The contactless power transmission apparatus 1 according to the present embodiment does not use resonance on the transmitter end. The frequency response of the output voltage from the contactless power transmission apparatus 1 thus resembles the frequency response of the output voltage for the increased capacitance of the capacitor connected in series to the transmitter coil and the lowered resonance frequency of the resonant circuit on the transmitter end in a contactless power transmission apparatus operating on the SPL topology including a reactor connected in series to the coil in the resonant circuit on the receiver end.

Figure 2:
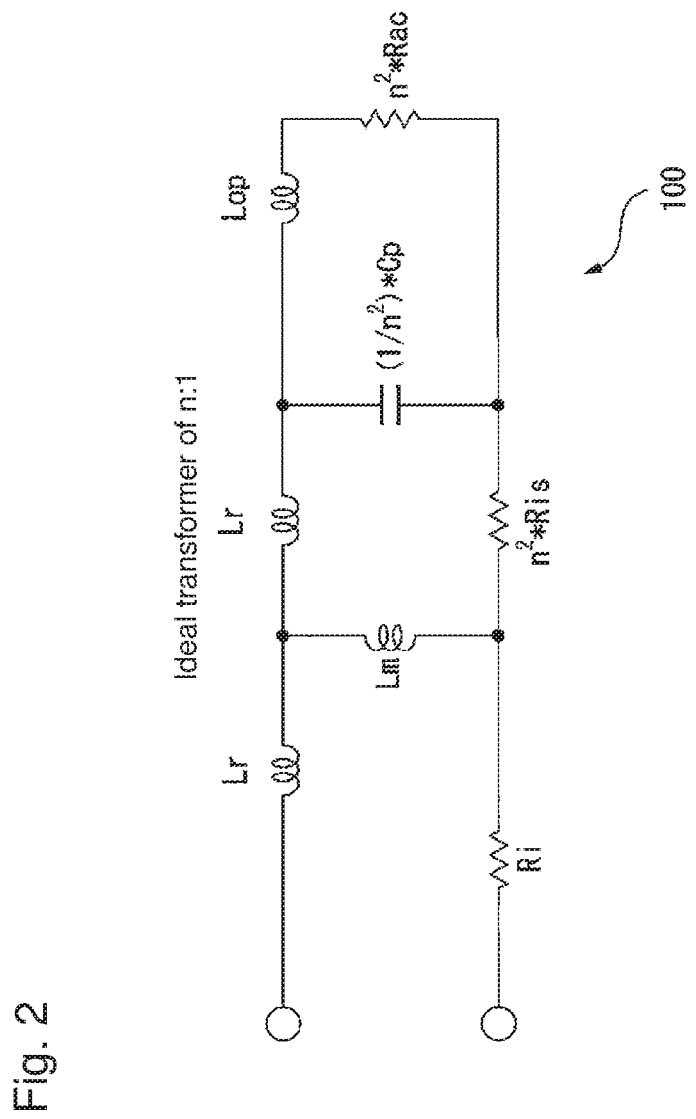
FIG. 2 is an equivalent circuit diagram of the contactless power transmission apparatus.

FIG. 2 is an equivalent circuit diagram of the contactless power transmission apparatus 1. In an equivalent circuit 100, the transmitter coil 14 on the transmitter end couples with the receiver coil 21 in the resonant circuit 20 on the receiver end to form an ideal transformer of n:1. In this circuit, Lr is the leakage inductance of the transmitter coil 14 on the transmitter end, and Lm is the magnetizing inductance of the transmitter coil 14. An inductance Lp of the transmitter coil 14 on the transmitter end is equal to (Lm+Lr), and Lr=(1−k)Lp and Lm=kLp, where k is the degree of coupling between the transmitter coil 14 and the receiver coil 21. Ri is the coil resistance on the transmitter end, and Ris is the coil resistance on the receiver end. Cp is the capacitance of the resonant capacitor 22 connected in parallel to the receiver coil 21 in the resonant circuit 20 on the receiver end. Lop is the inductance of the coil 23 connected in series to the receiver coil 21. Rac is the AC equivalent resistance of the load circuit 27, and Rac=$(8/\pi^2) \times$Ro.

Figure 3:
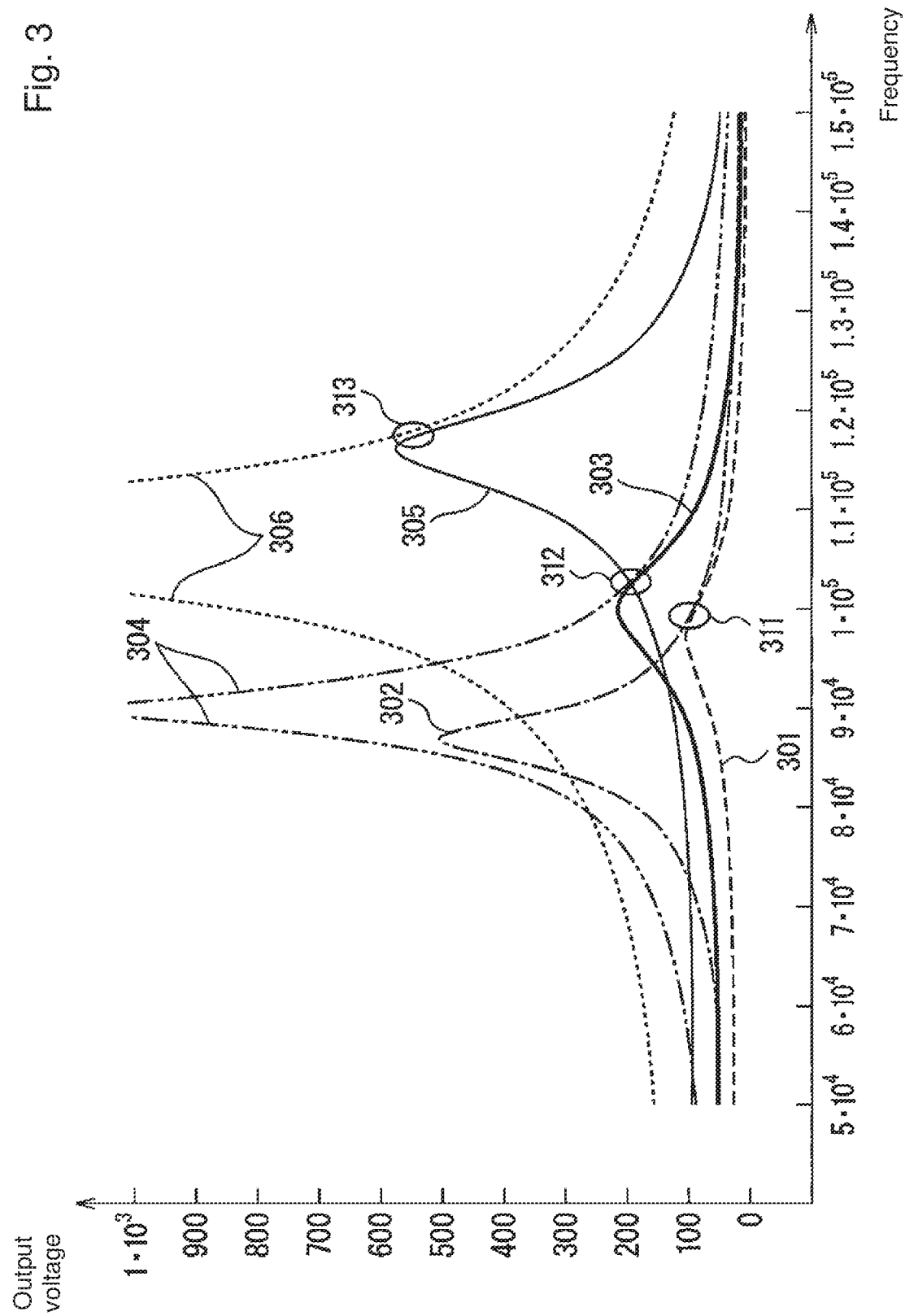
FIG. 3 is a graph showing example simulation results for the frequency response of the output voltage from the contactless power transmission apparatus according to the embodiment.

FIG. 3 is a graph showing example simulation results for the frequency response of the output voltage from the contactless power transmission apparatus 1 according to the present embodiment. In FIG. 3, the horizontal axis represents the frequency, and the vertical axis represents the output voltage. In this simulation, Lp=174 μH, Cp=20 nF, Lop=3Lp, Ri=Ris=0.3Ω, n=1, Vin=200 V, and Ro=200Ω (Rac≈162.1Ω). A line 301 represents the frequency response of the output voltage for the degree of coupling k=0.15 and the AC equivalent resistance of the load circuit 27 being Rac. A line 302 represents the frequency response of the output voltage for the degree of coupling k=0.15 and the AC equivalent resistance of the load circuit 27 being (10*Rac). A line 303 represents the frequency response of the output voltage for the degree of coupling k=0.3 and the AC equivalent resistance of the load circuit 27 being Rac. A line 304 represents the frequency response of the output voltage for the degree of coupling k=0.3 and the AC equivalent resistance of the load circuit 27 being (10*Rac). A line 305 represents the frequency response of the output voltage for the degree of coupling k=0.6 and the AC equivalent resistance of the load circuit 27 being Rac. A line 306 represents the frequency response of the output voltage for the degree of coupling k=0.6 and the AC equivalent resistance of the load circuit 27 being (10*Rac).

As shown in FIG. 3, the graph includes, for each degree of coupling k (at three plots 311 to 313 in the figure), the combination of the frequency and the output voltage that causes an output voltage to be substantially constant (or a constant voltage output) against a varying AC equivalent resistance of the load circuit 27 under the constant degree of coupling k. This reveals that the contactless power transmission apparatus 1 can output a constant voltage for a varying resistance of the load circuit 27 when the transmitter coil 14 receives AC power with a switching frequency at which the transmitter coil 14 does not resonate. Further, although the output voltage being constant against a varying resistance of the load circuit 27 differs depending on the degree of coupling as indicated at the plots 311 to 313, adjusting the voltage applied to the transmitter coil 14 can eliminate this difference in the output voltage and enable the output voltage to be substantially constant at any degree of coupling.

Figure 4:
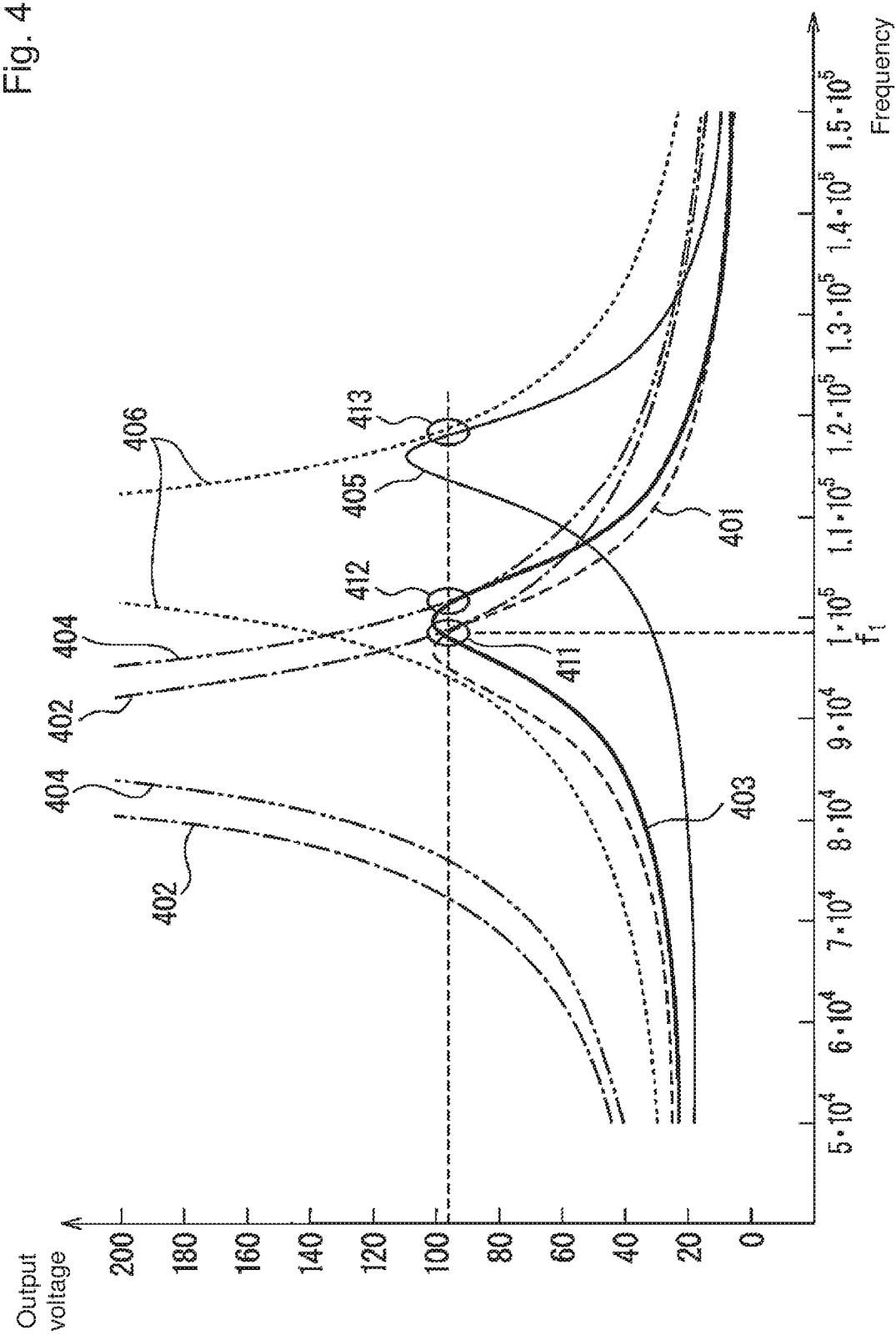
FIG. 4 is a graph showing example simulation results for the frequency response of the output voltage for a varying voltage applied to a transmitter coil in accordance with the degree of coupling in the simulation shown in FIG. 3.

FIG. 4 is a graph showing example simulation results for the frequency response of the output voltage for a varying voltage applied to the transmitter coil 14 in accordance with the degree of coupling in the simulation shown in FIG. 3. In FIG. 4, the horizontal axis represents the frequency, and the vertical axis represents the output voltage. A line 401 represents the frequency response of the output voltage for the degree of coupling k=0.15, the AC equivalent resistance of the load circuit 27 being Rac, and a voltage applied to a transmitter coil being Vin. A line 402 represents the frequency response of the output voltage for the degree of coupling k=0.15, the AC equivalent resistance of the load circuit 27 being (10*Rac), and a voltage applied to a transmitter coil being Vin. A line 403 represents the frequency response of the output voltage for the degree of coupling k=0.3, the AC equivalent resistance of the load circuit 27 being Rac, and a voltage applied to a transmitter coil being (0.47*Vin). A line 404 represents the frequency response of the output voltage for the degree of coupling k=0.3, the AC equivalent resistance of the load circuit 27 being (10*Rac), and a voltage applied to a transmitter coil being (0.47*Vin). A line 405 represents the frequency response of the output voltage for the degree of coupling k=0.6, the AC equivalent resistance of the load circuit 27 being Rac, and a voltage applied to a transmitter coil being (0.19*Vin). A line 406 represents the frequency response of the output voltage for the degree of coupling k=0.6, the AC equivalent resistance of the load circuit 27 being (10*Rac), and a voltage applied to a transmitter coil being (0.19*Vin).

The combinations of the frequency and the output voltage at three plots 411 to 413 correspond to the combinations at the three plots 311 to 313 shown in FIG. 3 that cause an output voltage to be substantially constant (or a constant voltage output) against a varying AC equivalent resistance of the load circuit 27 under the constant degree of coupling k. The output voltages at the plots 411 to 413 are substantially equal to one another.

This reveals that appropriately adjusting the switching frequency and the voltage of the AC power applied to the transmitter coil 14 enables the output voltage to remain substantially constant independently of the varying resistance of the load circuit 27 or the varying degree of coupling k.

The inventors have also noticed that the contactless power transmission apparatus 1 has a minimum input impedance at the frequency at which the contactless power transmission apparatus 1 outputs a constant voltage when the load circuit 27 in the receiver 3 has a preset resistance. The inventors have also noticed that the frequency at which the contactless power transmission apparatus 1 outputs a constant voltage has the same phase as the frequency at which the output voltage reaches the maximum when the load circuit 27 has a small, negligible resistance and also as the frequency at which the input impedance of the contactless power transmission apparatus 1 reaches the minimum.

Figure 5:
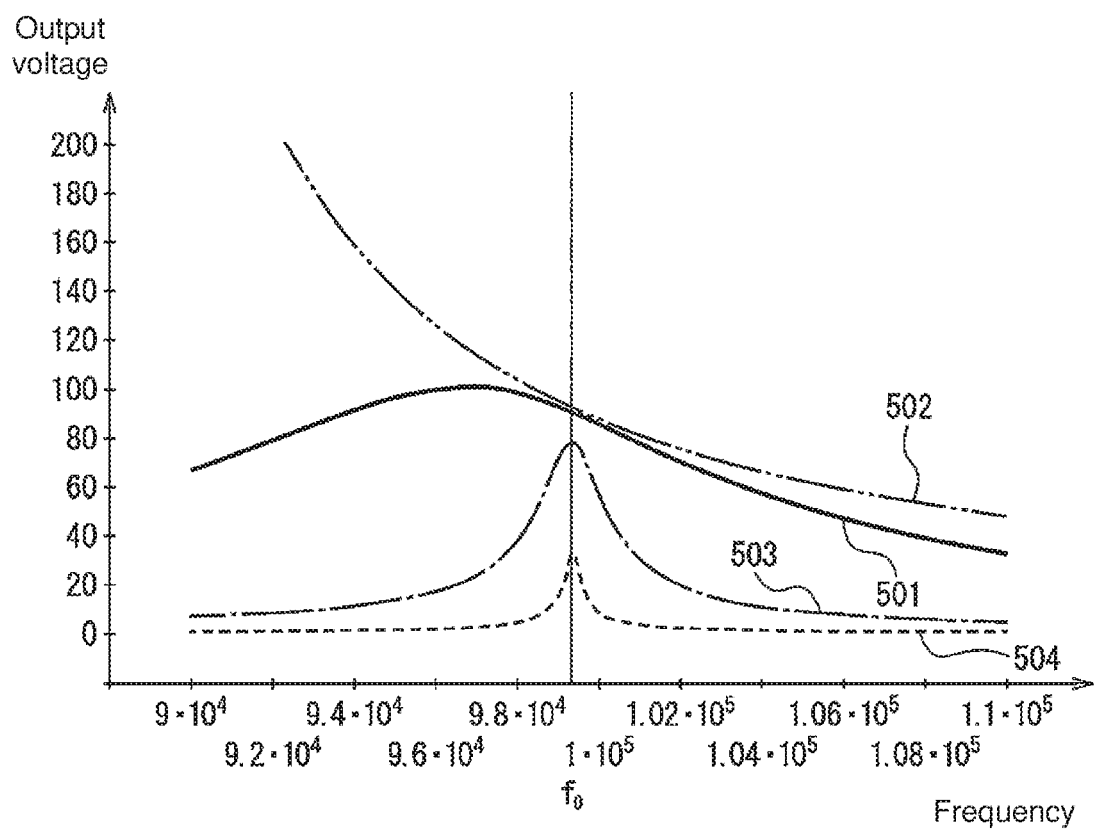
FIG. 5 is a graph showing example simulation results for the frequency response of the output voltage for a varying impedance of a circuit connected to a resonant circuit under the constant degree of coupling.

FIG. 5 is a graph showing example simulation results for the frequency response of the output voltage for a varying impedance of the circuit connected to the resonant circuit 20 under the constant degree of coupling. In FIG. 5, the horizontal axis represents the frequency, and the vertical axis represents the output voltage. A line 501 represents the frequency response of the output voltage for the degree of coupling k=0.15 and the AC equivalent resistance of the load circuit 27 being Rac. A line 502 represents the frequency response of the output voltage for the degree of coupling k=0.15 and the AC equivalent resistance of the load circuit 27 being (10*Rac). A line 503 represents the frequency response of the output voltage for the degree of coupling k=0.15 and the AC equivalent resistance of the load circuit 27 being (0.1*Rac). A line 504 represents the frequency response of the output voltage for the degree of coupling k=0.15 and the AC equivalent resistance of the load circuit 27 being (0.01*Rac). The simulation uses the same parameter values as for the circuit elements used in the simulation shown in FIG. 3.

As shown in FIG. 5, when the AC equivalent resistance value of the load circuit 27 is decreased to extremely small values indicated by the lines 503 and 504, the output voltage reaches its maximum at a frequency f0, at which the substantially the same output values are observed for the AC equivalent resistances of the load circuit 27 being Rac and (10*Rac). This is based on the following formula set that is held when the load circuit 27 has an AC equivalent resistance of substantially 0.

Formula 1

$$\frac{1}{\frac{1}{\omega L_{r2}} + \omega C_p} + \omega L_{op} = 0 \quad (1)$$

$$\omega = 2\pi f, \, L_{r2} = L_2(1 - k^2)$$

where Lop is the inductance of the coil 23 connected in series to the receiver coil 21, Cp is the capacitance of the resonant capacitor 22, L2 is the self-inductance of the receiver coil 21, k is the degree of coupling, Lr2 is the inductance of the receiver coil 21 when the transmitter coil 14 is short-circuited, and f is the frequency of AC power applied to the transmitter coil 14. Thus, the output voltage reaches its maximum at the frequency f0 represented by the following formula obtained by solving the formula (1) for the frequency f.

Formula 2

$$f0 = \frac{\sqrt{\frac{L_{r2} + L_{op}}{L_{r2} L_{op} C_p}}}{2\pi} \quad (2)$$

The output voltage is lower at the frequency f0 when the AC equivalent resistance of the load circuit 27 is (0.1*Rac) or (0.01*Rac) than when it is Rac. This is because the load circuit 27 with an extremely smaller AC equivalent resistance allows a greater current to flow, increasing the likelihood of a voltage drop.

FIG. 6 includes graphs showing an example relationship between the frequency response of the output voltage and the frequency response of the input impedance in the contactless power transmission apparatus. In the upper graph in FIG. 6, the horizontal axis represents the frequency, and the vertical axis represents the output voltage. In the lower graph in FIG. 6, the horizontal axis represents the frequency, and the vertical axis represents the input impedance. The simulation also uses the same parameter values as for the circuit elements used in the simulation shown in FIG. 3. In the upper graph, a line 601 (identical to the line 501 in FIG. 5) represents the frequency response of the output voltage from the contactless power transmission apparatus 1 for the degree of coupling k=0.15 and the AC equivalent resistance of the load circuit 27 being Rac. A line 602 (identical to the line 502 in FIG. 5) represents the frequency response of the output voltage from the contactless power transmission apparatus 1 for the degree of coupling k=0.15 and the AC equivalent resistance of the load circuit 27 being (10*Rac). A line 603 (identical to the line 503 in FIG. 5) represents the frequency response of the output voltage for the degree of coupling k=0.15 and the AC equivalent resistance of the load circuit 27 being (0.1*Rac). A line 604 (identical to the line 504 in FIG. 5) represents the frequency response of the output voltage for the degree of coupling k=0.15 and the AC equivalent resistance of the load circuit 27 being (0.01*Rac).

In the lower graph, a line 611 represents the frequency response of the input impedance of the contactless power transmission apparatus 1 for the degree of coupling k=0.15 and the AC equivalent resistance of the load circuit 27 being Rac. A line 612 represents the frequency response of the input impedance of the contactless power transmission apparatus 1 for the degree of coupling k=0.15 and the AC equivalent resistance of the load circuit 27 being (10*Rac). A line 613 represents the frequency response of the input impedance of the contactless power transmission apparatus 1 for the degree of coupling k=0.15 and the AC equivalent resistance of the load circuit 27 being (0.1*Rac). A line 614 represents the frequency response of the input impedance of the contactless power transmission apparatus 1 for the degree of coupling k=0.15 and the AC equivalent resistance of the load circuit 27 being (0.01*Rac).

As shown in FIG. 6, with a smaller AC equivalent resistance of the load circuit 27, the frequency at which the input impedance reaches the minimum is nearer the frequency f0, at which the contactless power transmission apparatus 1 outputs a constant voltage. In particular, when the load circuit 27 has an AC equivalent resistance of (0.01*Rac), the input impedance reaches the minimum at the frequency f0. In other words, the current through the transmitter coil 14 reaches the maximum at the frequency f0.

Figure 7:
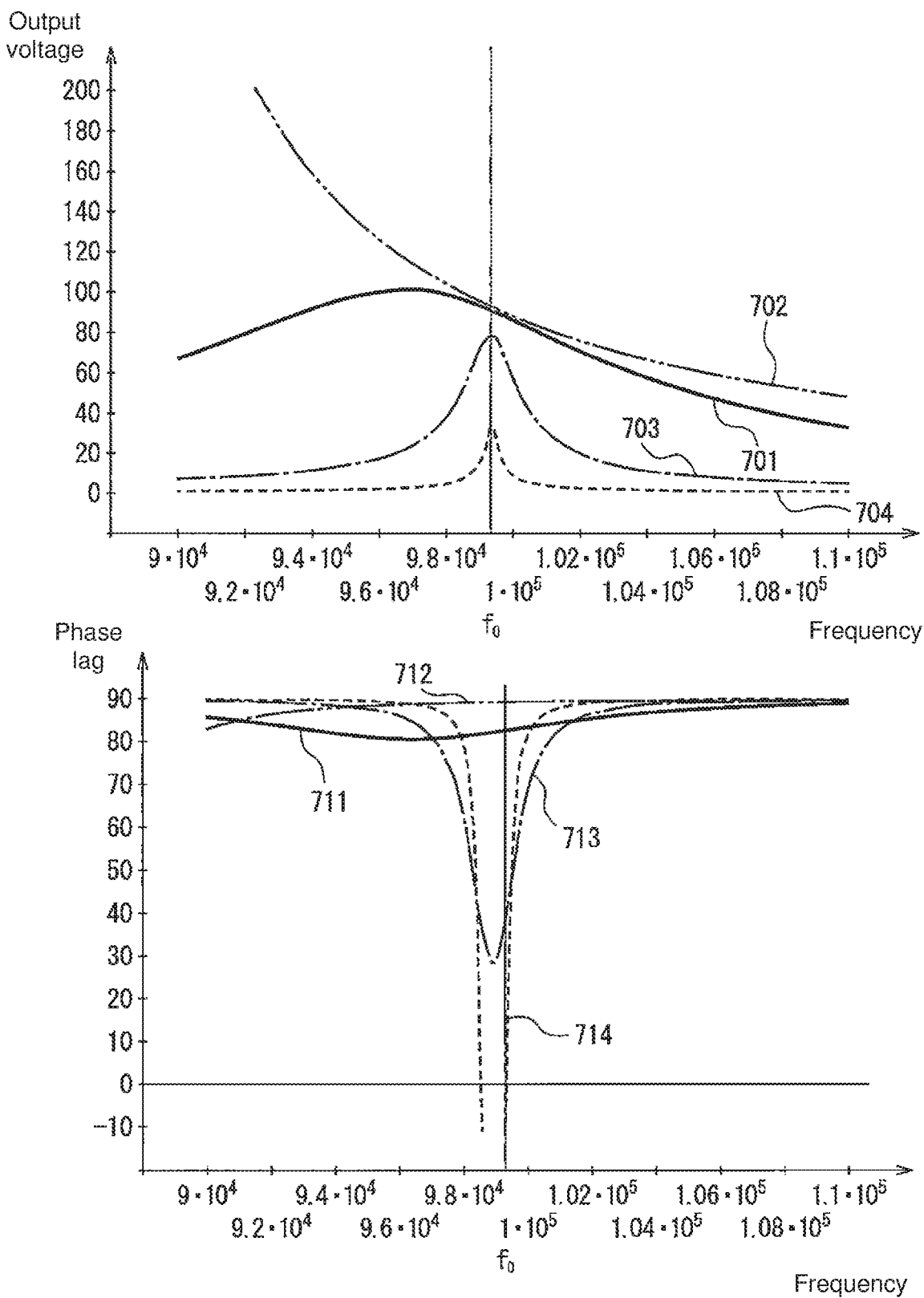
FIG. 7 includes graphs showing an example relationship between the frequency response of the output voltage from the contactless power transmission apparatus and the frequency response of a phase lag of the current relative to the voltage of the AC power applied to the transmitter coil.

FIG. 7 includes graphs showing an example relationship between the frequency response of the output voltage from the contactless power transmission apparatus and the frequency response of a phase lag of the current relative to the voltage of the AC power applied to the transmitter coil 14. In the upper graph in FIG. 7, the horizontal axis represents the frequency, and the vertical axis represents the output voltage. In the lower graph in FIG. 7, the horizontal axis represents the frequency, and the vertical axis represents the phase lag. In the graph, the phase lag with a positive value indicates that the phase of the current is delayed relative to the phase of the voltage. The simulation uses the same parameter values as for the circuit elements used in the simulation shown in FIG. 3. In the upper graph, a line 701 (identical to the line 501 in FIG. 5) represents the frequency response of the output voltage from the contactless power transmission apparatus 1 for the degree of coupling k=0.15 and the AC equivalent resistance of the load circuit 27 being Rac. A line 702 (identical to the line 502 in FIG. 5) represents the frequency response of the output voltage from the contactless power transmission apparatus 1 for the degree of coupling k=0.15 and the AC equivalent resistance of the load circuit 27 being (10*Rac). A line 703 (identical to the line 503 in FIG. 5) represents the frequency response of the output voltage for the degree of coupling k=0.15 and the AC equivalent resistance of the load circuit 27 being (0.1*Rac). A line 704 (identical to the line 504 in FIG. 5) represents the frequency response of the output voltage for the degree of coupling k=0.15 and the AC equivalent resistance of the load circuit 27 being (0.01*Rac).

A line 711 in the lower graph represents the frequency response of a phase lag of the current relative to the voltage for the AC power applied to the transmitter coil 14, obtained for the degree of coupling k=0.15 and the AC equivalent resistance of the load circuit 27 being Rac. A line 712 represents the frequency response of a phase lag of the current relative to the voltage for the AC power applied to the transmitter coil 14, obtained for the degree of coupling k=0.15 land the AC equivalent resistance of the load circuit 27 being (10*Rac). A line 713 represents the frequency response of a phase lag of the current relative to the voltage for the AC power applied to the transmitter coil 14, obtained for the degree of coupling k=0.15 and the AC equivalent resistance of the load circuit 27 being (0.1*Rac). A line 714 represents the frequency response of a phase lag of the current relative to the voltage for the AC power applied to the transmitter coil 14, obtained for the degree of coupling k=0.15 and the AC equivalent resistance of the load circuit 27 being (0.01*Rac).

As shown in FIG. 7, with a smaller AC equivalent resistance of the load circuit 27, the frequency at which the phase lag of the current relative to the voltage of the AC power applied to the transmitter coil 14 is 0 is nearer the frequency f0, at which the contactless power transmission apparatus 1 outputs a constant voltage. In particular, when the AC equivalent resistance of the load circuit 27 is (0.01*Rac), the phase lag of the current relative to the voltage for the AC power applied to the transmitter coil 14 at the frequency f0 is 0, or more specifically, the power factor is 1. More specifically, at frequencies higher than the frequency f0, the phase lag of the current relative to the voltage for the AC power applied to the transmitter coil 14 is a positive value for the AC equivalent resistance of the load circuit 27 being (0.01*Rac). This represents inductive driving. The contactless power transmission apparatus 1 thus enables the power supply circuit 10 and the transmitter coil 14 to perform a soft-switching operation particularly in a frequency band with the phase lag of 0 to 90°. At frequencies lower than the frequency f0, the phase lag of the current relative to the voltage for the AC power applied to the transmitter coil 14 is a negative value. This represents capacitive driving. The contactless power transmission apparatus 1 thus causes the power supply circuit 10 and the transmitter coil 14 to perform a hard switching operation particularly in a frequency band with the phase lag of 0 to −90°, decreasing power transmission efficiency.

The control circuit 19 controls the switching frequency and the voltage of the AC power to be applied to the transmitter coil 14 in the manner described below to enable a constant voltage output operation.

When the determination information included in the radio signal received from the receiver 3 through the communicator 17 indicates that the contactless power transmission apparatus 1 is not outputting a constant voltage, the control circuit 19 retains, through the gate driver 18, the off state of the switching element 13-1 and alternately turns on and off the switching elements 13-3 and 13-2 to supply power to the transmitter coil 14 through the DC-DC converter 12. The control circuit 19 controls the voltage-variable power source 11 to supply a voltage having a predetermined value to the transmitter coil 14 through the DC-DC converter 12. The control circuit 19 reduces power supplied from the transmitter 2 to the receiver 3 by a degree that does not cause a breakdown of the receiver 3.

The control circuit 19 then monitors, while varying the switching frequency, the measurement value of the current through the transmitter coil 14 with the current detection circuit 16, and detects the switching frequency at which the measurement value of the current reaches the maximum. As in the present embodiment, while the contactless power transmission apparatus 1 is not outputting a constant voltage, the resonant circuit 20 in the receiver 3 is short-circuited through the coil 23, decreasing the impedance of a circuit connected to the resonant circuit 20 to a negligible value. In this case, as shown in FIG. 6, near the switching frequency at which the measurement value of the current through the transmitter coil 14 reaches the maximum, the measurement value of the current changes rapidly in response to a change in the switching frequency. The control circuit 19 may thus detect the switching frequency at which the measurement value of the current reaches a predetermined threshold or a value greater than the threshold as the switching frequency at which the measurement value of the current reaches the maximum. The predetermined threshold may be, for example, a value corresponding to a value of the current through the transmitter coil 14 at a switching frequency shifted by a predetermined tolerance from the switching frequency at which the value of the current through the transmitter coil 14 reaches the maximum.

The switching frequency at which the measurement value of the current through the transmitter coil 14 reaches the maximum is the frequency at which the input impedance of the contactless power transmission apparatus 1 reaches the minimum, such as the frequency f0 shown in FIG. 6, or more specifically, the frequency at which the contactless power transmission apparatus 1 outputs a constant voltage. Upon detecting the switching frequency at which the measurement value of the current through the transmitter coil 14 reaches the maximum, the control circuit 19 controls the on-off state of the switching elements 13-1 and 13-2 through the gate driver 18 to supply power from the voltage-variable power source 11 to the transmitter coil 14 at the switching frequency. The control circuit 19 turns off the switching element 13-3. In the manner described above, the control circuit 19 allows the contactless power transmission apparatus 1 to output a constant voltage. The control circuit 19 then provides, to the communicator 17, detection information indicating that the switching frequency at which the contactless power transmission apparatus 1 outputs a constant voltage has been detected and causes the communicator 17 to transmit a radio signal including the detection information to the communicator 31 in the receiver 3.

Subsequently, the control circuit 19 controls the voltage-variable power source 11 in the power supply circuit 10 to supply a voltage corresponding to the switching frequency to the transmitter coil 14 and allows the measurement value of the output voltage from the resonant circuit 20 in the receiver 3 to be within a predetermined allowable range. The control circuit 19 determines the voltage of the power to be supplied from the voltage-variable power source 11 by, for example, referring to a reference table indicating the correspondence between each switching frequency and the voltage of the power supplied from the voltage-variable power source 11. The reference table is prestored in, for example, a memory included in the control circuit 19.

After receiving, from the receiver 3, determination information indicating that the measurement value of the output voltage is out of the predetermined allowable range, the control circuit 19 may not determine the switching frequency for a predetermined period from when transmitting the detection information to the receiver 3 to when changing the voltage of the AC power to be applied to the transmitter coil 14 to the voltage corresponding to the switching frequency. This prevents the control circuit 19 from redundantly searching for the switching frequency again after detecting the switching frequency at which the contactless power transmission apparatus 1 outputs a constant voltage.

The control circuit 19 may not refer to the reference table, but may instead gradually change the voltage of the power supplied from the voltage-variable power source 11 until the determination information included in the radio signal received from the receiver 3 through the communicator 17 indicates that the measurement value of the output voltage is within the allowable range of voltages.

In one modification, the control circuit 19 may monitor, while varying the switching frequency, the measurement value of the current through the transmitter coil 14 with the current detection circuit 16 and detect the switching frequency at which the phase lag of the current relative to the voltage of the AC power to be applied to the transmitter coil 14 is 0. In this case, the control circuit 19 may identify the phase of the voltage of the AC power to be applied to the transmitter coil 14 based on, for example, the timing of turning on and off the switching elements 13-3 and 13-2 and the time constant corresponding to the inductance of the transmitter coil 14 and the capacitance of the capacitor 15. The control circuit 19 may determine the phase of the current through the transmitter coil 14 based on the time-varying measurement value of the current through the transmitter coil 14 obtained with the current detection circuit 16.

As shown in FIG. 7, the switching frequency at which the phase lag of the current relative to the voltage of the AC power applied to the transmitter coil 14 is 0 is the frequency at which the contactless power transmission apparatus 1 outputs a constant voltage. Upon detecting the switching frequency at which the phase lag of the current relative to the voltage of the AC power applied to the transmitter coil 14 is 0, the control circuit 19 may control, as in the above embodiment, the on-off state of the switching elements 13-1 and 13-2 and the switching element 13-3 to be off through the gate driver 18 to supply power from the voltage-variable power source 11 to the transmitter coil 14 at the detected switching frequency. In this modification as well, the control circuit 19 may detect the switching frequency at which the absolute value of the difference between the phases of the voltage and current of the AC power applied to the transmitter coil 14 reaches the threshold or a value smaller than the threshold as the switching frequency at which the phase lag of the current relative to the voltage of the AC power to be applied to the transmitter coil 14 is 0.

As described above, the contactless power transmission apparatus measures the current through the transmitter coil in the transmitter while the resonant circuit in the receiver is short-circuited through the coil connected in series to the receiver coil, and detects the switching frequency of the AC power to be applied to the transmitter coil at which the current reaches the maximum or the voltage across the transmitter coil has the same phase as the current through the transmitter coil. The contactless power transmission apparatus can thus correctly detect the switching frequency at which a constant voltage is output. The contactless power transmission apparatus then adjusts the voltage of the AC power to be applied to the transmitter coil to output a constant voltage at the detected switching frequency after the resonant circuit is open. The contactless power transmission apparatus can thus output a constant voltage at a non-constant degree of coupling between the transmitter coil and the receiver coil or at a non-constant resistance of the load circuit.

In one modification, the receiver 3 may include, separately from the resonant circuit that resonates with the AC power applied to the transmitter coil 14, an output coil for outputting transmitted power.

Figure 8:
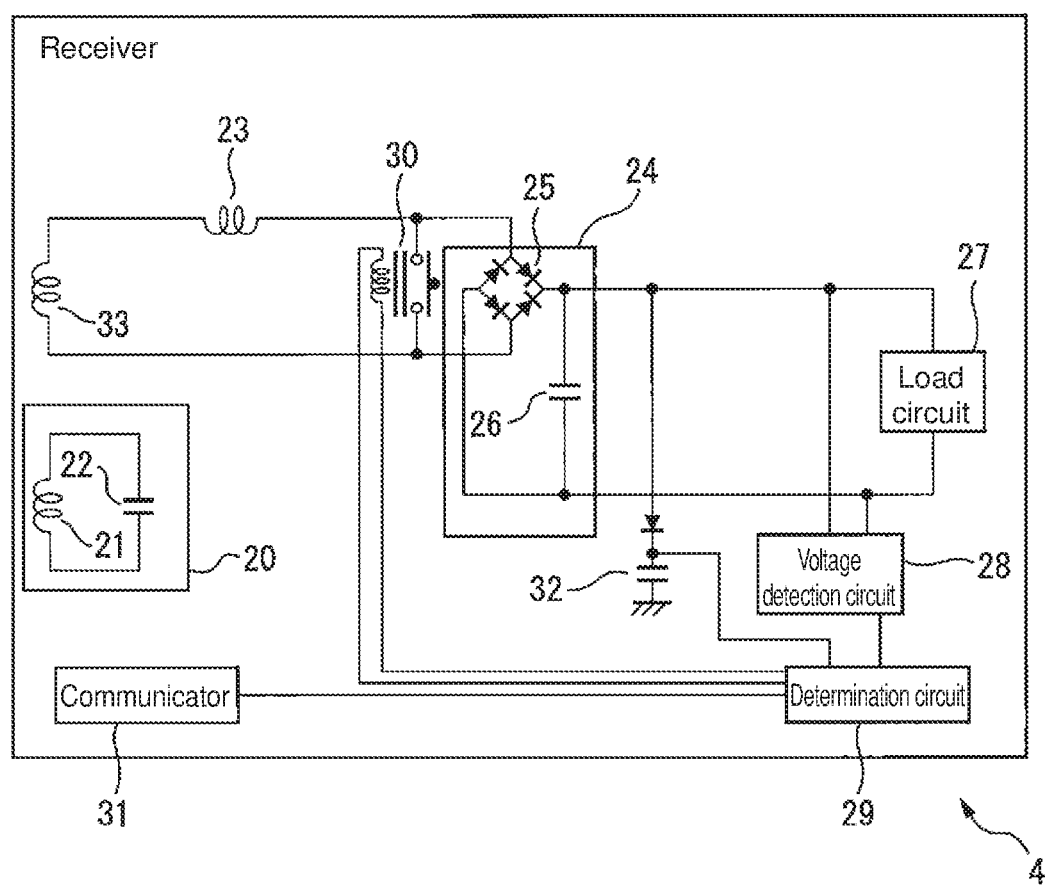
FIG. 8 is a schematic diagram of a receiver according to a modification.

FIG. 8 is a schematic diagram of a receiver 4 according to a modification. As shown in FIG. 8, the receiver 4 according to the modification includes a resonant circuit 20 including a receiver coil 21 and a resonant capacitor 22, a coil 23, a rectifier-smoothing circuit 24 including a full wave rectifier circuit 25 and a smoothing capacitor 26, a load circuit 27, a voltage detection circuit 28, a determination circuit 29, a relay 30, a communicator 31, a charge storage circuit 32, and an output coil 33. The receiver 4 according to the modification differs from the receiver 3 in the above embodiment in including the output coil 33 and in outputting transmitted power from the output coil 33 instead of from the resonant circuit 20. The differences and associated portions will now be described.

The output coil 33 is located to be electromagnetically coupled to the receiver coil 21 in the resonant circuit 20. For example, the output coil 33 and the receiver coil 21 are wound around the same core wire. The output coil 33 thus forms a transformer together with the receiver coil 21, allowing power received by the receiver coil 21 to be output from the output coil 33. The output coil 33 has one end connected to one input terminal of the rectifier-smoothing circuit 24 through the coil 23. The output coil 33 also has the other end connected to the other input terminal of the rectifier-smoothing circuit 24. The power output from the output coil 33 though the resonant circuit 20 is supplied to the load circuit 27 through the coil 23 and the rectifier-smoothing circuit 24. In this modification, the resonant circuit 20 is not directly connected to the coil 23 and the rectifier-smoothing circuit 24.

In the modification, the receiver coil 21 and the output coil 33 may have the same number or different numbers of turns. For example, when the receiver coil 21 has more turns than the output coil 33, the output power may have a lower voltage at high power transmission efficiency. In this modification, with the receiver coil 21 having more turns than the output coil 33, a circuit for lowering the voltage, such as a DC-DC converter, is not used for the load circuit 27 with a low upper limit for the receivable voltage.

In the modification as well, the relay 30 may have one end connected between the coil 23 and one input terminal of the rectifier-smoothing circuit 24 and the other end connected between the resonant circuit 20 and the other input terminal of the rectifier-smoothing circuit 24. When the output voltage value measured by the voltage detection circuit 28 is out of the predetermined allowable range, the determination circuit 29 may turn on the relay 30 to short-circuit the two ends of the output coil 33 through the coil 23. The resonant circuit 20 is thus short-circuited through the coil 23. The impedance of a circuit connected to the resonant circuit 20 decreases to a negligible value. The contactless power transmission apparatus according to this modification can correctly detect the switching frequency at which a constant voltage is output in the same manner as the contactless power transmission apparatus in the embodiment.

In another modification, the relay 30 may be a normally-on relay.

Figure 9:
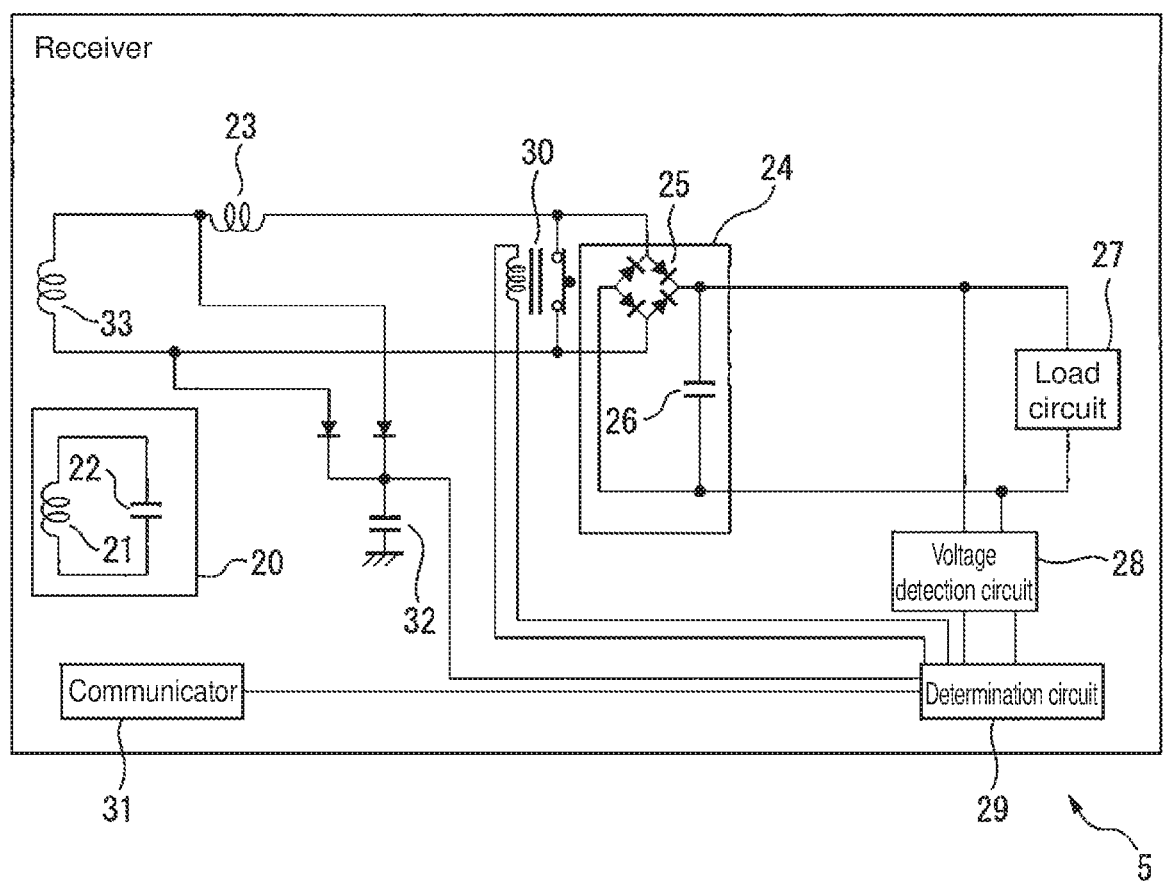
FIG. 9 is a schematic diagram of a receiver according to another modification.

FIG. 9 is a schematic diagram of a receiver 5 according to another modification. As shown in FIG. 9, the receiver 5 according to this modification includes a resonant circuit 20 including a receiver coil 21 and a resonant capacitor 22, a coil 23, a rectifier-smoothing circuit 24 including a full wave rectifier circuit 25 and a smoothing capacitor 26, a load circuit 27, a voltage detection circuit 28, a determination circuit 29, a relay 30, a communicator 31, a charge storage circuit 32, and an output coil 33. The receiver 5 in this modification differs from the receiver 4 in the above modification in including a different type of relay 30 and in the position of the power source that supplies power to the charge storage circuit 32. The differences and associated portions will now be described.

In this modification, the relay 30, which is a normally-on relay, is driven to be off by the determination circuit 29 when the contactless power transmission apparatus is outputting a constant voltage, or more specifically, the output voltage value measured by the voltage detection circuit 28 is within the predetermined allowable range. When the output voltage value measured by the voltage detection circuit 28 is out of the predetermined allowable range, the determination circuit 29 turns on the relay 30. Subsequently, when receiving, from the transmitter 2 through the communicator 31, a notification indicating that the transmitter end has detected the switching frequency at which the contactless power transmission apparatus outputs a constant voltage, the determination circuit 29 turns off the relay 30 using power charged in the charge storage circuit 32.

The charge storage circuit 32 charges power supplied from the two ends of the output coil 33 and rectified through a diode while the receiver 5 is receiving power from the transmitter 2. In this example, when the relay 30 is on and short-circuits the two ends of the output coil 33, the charge storage circuit 32, which is connected immediately after the output coil 33, can still charge transmitted power while the switching frequency is being searched for. The power charged in the charge storage circuit 32 is used to turn off the relay 30 as described above.

The contactless power transmission apparatus according to this modification can also short-circuit the resonant circuit 20 through the coil 23 during search for the switching frequency of the power to be applied to the transmitter coil 14 at which a constant voltage is output. The contactless power transmission apparatus according to this modification can thus correctly detect the switching frequency at which a constant voltage is output, similarly to the contactless power transmission apparatus in the above embodiment.

In still another modification, the receiver coil and the resonant capacitor may be connected in series in the resonant circuit in the receiver. In this case as well, the contactless power transmission apparatus can perform a constant voltage output operation. As in the above embodiment and the modifications, the contactless power transmission apparatus in this modification can detect the switching frequency at which a constant voltage is output by measuring the current through the transmitter coil while the resonant circuit is being short-circuited.

Figure 10:
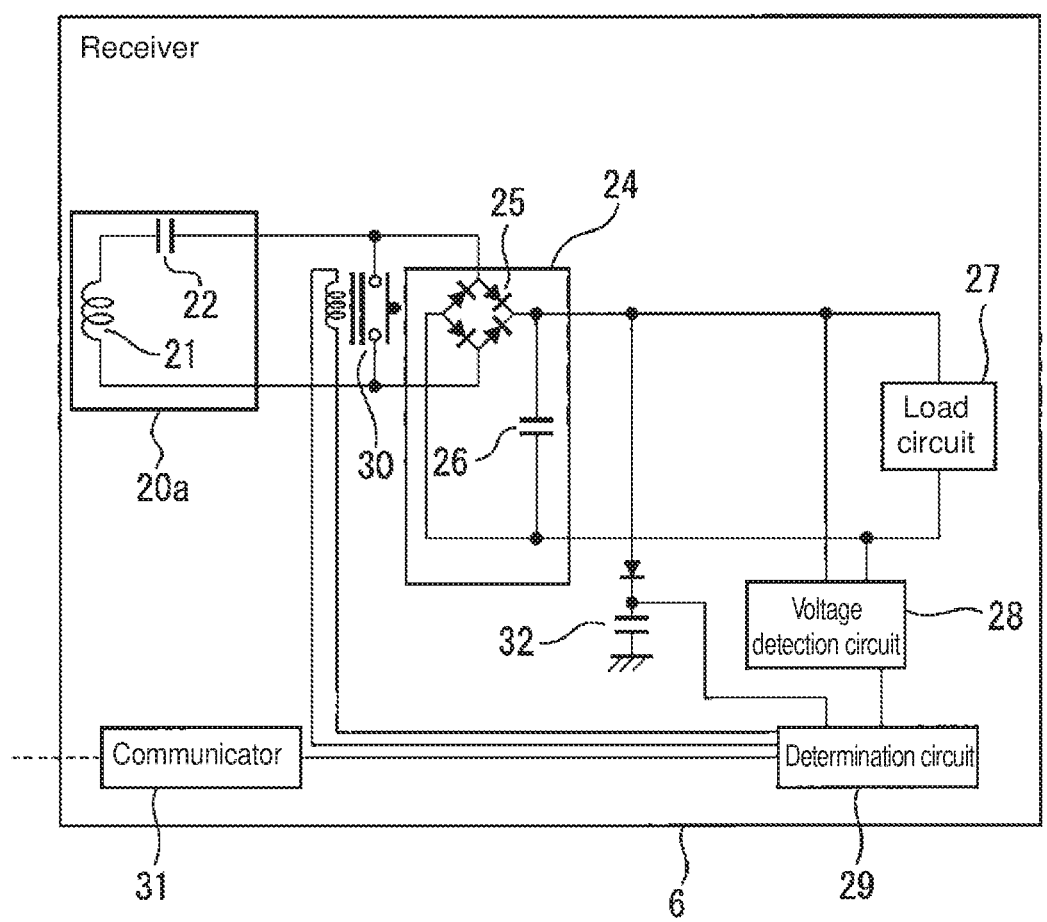
FIG. 10 is a schematic diagram of a receiver according to still another modification.

FIG. 10 is a schematic diagram of a receiver 6 according to this modification. As shown in FIG. 10, the receiver 6 according to this modification includes a resonant circuit 20a including a receiver coil 21 and a resonant capacitor 22, a rectifier-smoothing circuit 24 including a full wave rectifier circuit 25 and a smoothing capacitor 26, a load circuit 27, a voltage detection circuit 28, a determination circuit 29, a relay 30, a communicator 31, a charge storage circuit 32, and an output coil 33. The receiver 6 according to this modification differs from the receiver 3 shown in FIG. 1 in that the resonant circuit 20a with a different design is used and the coil 23 is eliminated. The differences and associated portions will now be described.

In the resonant circuit 20a, the receiver coil 21 and the resonant capacitor 22 are connected in series. The power received through the receiver coil 21 is output to the rectifier-smoothing circuit 24 through the resonant capacitor 22. In this case, the contactless power transmission apparatus including the transmitter 2 and the receiver 6 has the same design as primary series and secondary series capacitors (hereafter, SS topology) to perform a constant voltage output operation. Unlike the contactless power transmission apparatus based on the SPL topology, the resonant circuit 20a in this example causes series resonance, thus eliminating the coil 23. Unlike a system based on the SS topology, the contactless power transmission apparatus including the transmitter 2 and the receiver 6 may not use the resonance of the transmitter coil 14 on the transmitter end.

The power transmission efficiency in contactless power transmission is expressed as the product of the degree of coupling k between a transmitter coil and a receiver coil and the quality (Q) factor, which is an index of resonance intensity. To improve the power transmission efficiency, the Q factor is to be higher. In this modification, the receiver 6 operates as an RLC series resonant circuit as described above. In this case, the Q factor is written using the following formula.

Formula 3

$$Q = \frac{1}{R}\sqrt{\frac{L}{C}} \qquad (3)$$

where C is the capacitance of the resonant capacitor 22, L is the inductance of the receiver coil 21, and R is the impedance of a circuit connected to the resonant circuit 20a. From formula (3), the Q factor is lower as the impedance of the load circuit 27 is larger. For the load circuit 27 that consumes power at a constant rate, the voltage output from the resonant circuit 20a and the impedance of the load circuit 27 are to be lower to increase the Q factor. Conversely to the resonant circuit 20 in the above embodiment and modifications in which the receiver coil 21 and the resonant capacitor 22 resonate in parallel, the receiver 6 may have a greater inductance of the receiver coil 21 and a smaller capacitance of the resonant capacitor 22 to increase the Q factor, as clear from formula (3).

Figure 11:
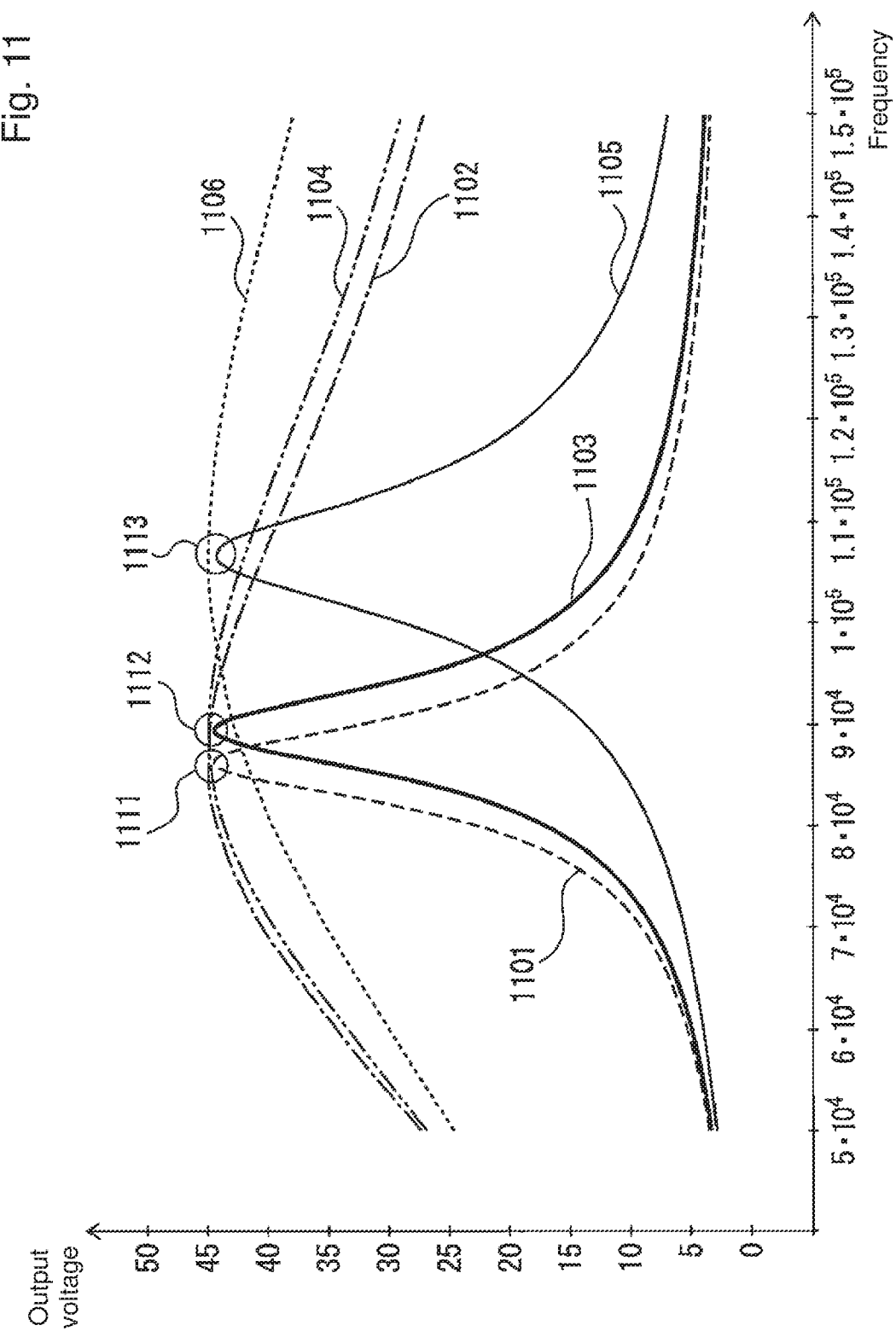
FIG. 11 is a graph showing example simulation results for the frequency response of the output voltage from a contactless power transmission apparatus including a transmitter shown in FIG. 1 and the receiver shown in FIG. 10.

FIG. 11 is a graph showing example simulation results for the frequency response of the output voltage from the contactless power transmission apparatus including the transmitter 2 and the receiver 6. In FIG. 11, the horizontal axis represents the frequency, and the vertical axis represents the output voltage. In this simulation, Lp=174 pH, Cp=20 nF, Ri=Ris=0.1Ω, n=1, Vin=300 V, and Ro=200Ω (Rac≈162.1Ω). A line 1101 represents the frequency response of the output voltage for the degree of coupling k=0.15 and the AC equivalent resistance of the load circuit 27 being Rac. A line 1102 represents the frequency response of the output voltage for the degree of coupling k=0.15 and the AC equivalent resistance of the load circuit 27 being (10*Rac). A line 1103 represents the frequency response of the output voltage for the degree of coupling k=0.3, the AC equivalent resistance of the load circuit 27 being Rac, and the voltage applied to the transmitter coil 14 being (0.5*Vin). A line 1104 represents the frequency response of the output voltage for the degree of coupling k=0.3, the AC equivalent resistance of the load circuit 27 being (10*Rac), and the voltage applied to the transmitter coil 14 being (0.5*Vin). A line 1105 represents the frequency response of the output voltage for the degree of coupling k=0.6, the AC equivalent resistance of the load circuit 27 being Rac, and the voltage applied to the transmitter coil 14 being (0.25*Vin). A line 1106 represents the frequency response of the output voltage for the degree of coupling k=0.6, the AC equivalent resistance of the load circuit 27 being (10*Rac), and the voltage applied to the transmitter coil 14 being (0.25*Vin).

As shown in FIG. 11, the graph includes, for each degree of coupling k (at three plots 1111 to 1113 in the figure), the combination of the frequency and the output voltage that causes an output voltage to be substantially constant (or a constant voltage output) against a varying AC equivalent resistance of the load circuit 27 under the constant degree of coupling k. Thus, the contactless power transmission apparatus according to this modification can also provide a substantially constant output voltage by adjusting the switching frequency and the voltage of the AC power to be applied to the transmitter coil 14 at any degree of coupling.

Figure 12:
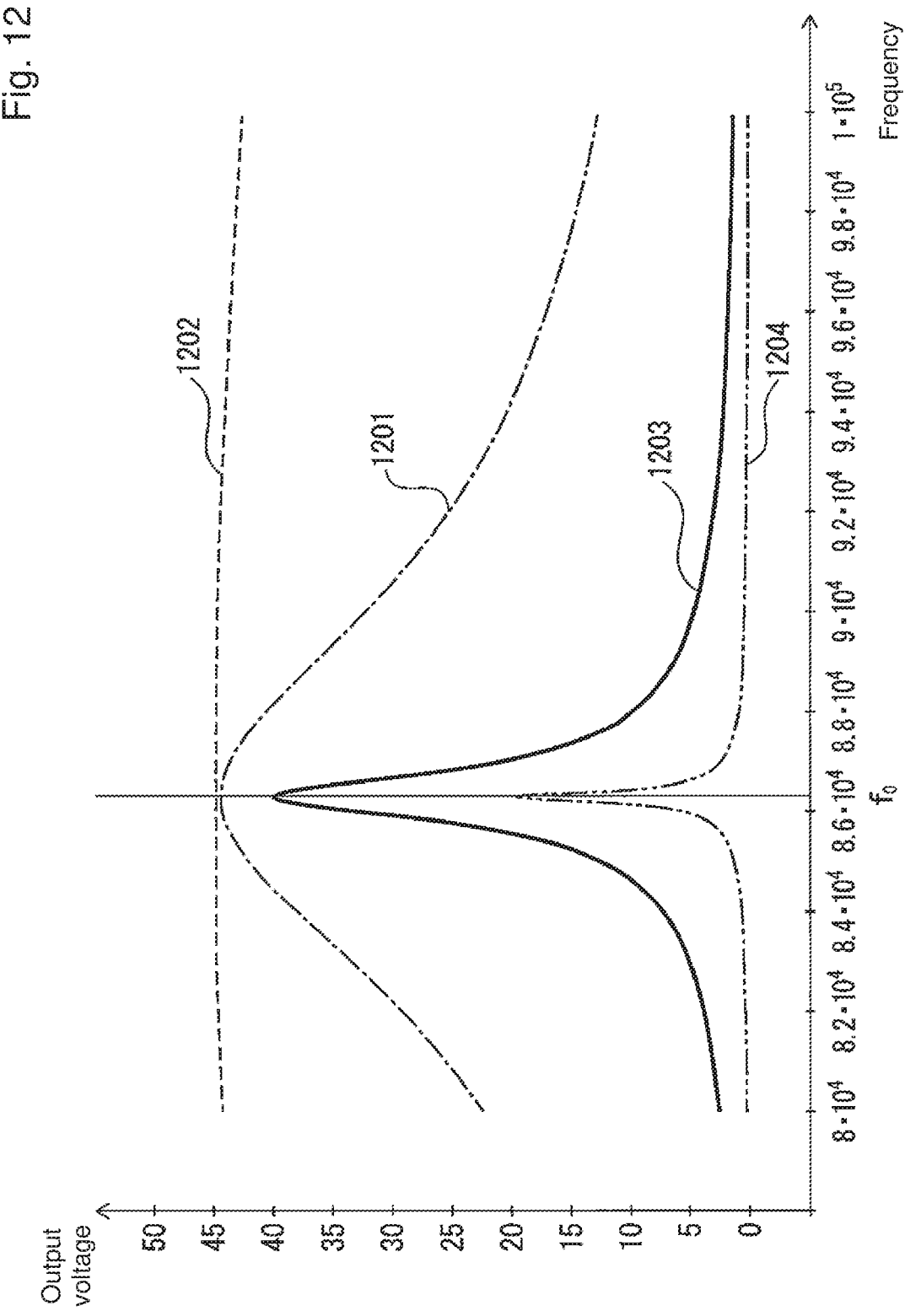
FIG. 12 is a graph showing example simulation results for the frequency response of the output voltage from the contactless power transmission apparatus including the transmitter shown in FIG. 1 and the receiver shown in FIG. 10, for a varying impedance of a circuit connected to a resonant circuit under the constant degree of coupling.

FIG. 12 is a graph showing example simulation results for the frequency response of the output voltage from the contactless power transmission apparatus including the transmitter 2 and the receiver 6, obtained for a varying impedance of a circuit connected to the resonant circuit 20a under the constant degree of coupling.

In FIG. 12, the horizontal axis represents the frequency, and the vertical axis represents the output voltage. A line 1201 represents the frequency response of the output voltage for the degree of coupling k=0.15 and the AC equivalent resistance of the load circuit 27 being Rac. A line 1202 represents the frequency response of the output voltage for the degree of coupling k=0.15 and the AC equivalent resistance of the load circuit 27 being (10*Rac). A line 1203 represents the frequency response of the output voltage for the degree of coupling k=0.15 and the AC equivalent resistance of the load circuit 27 being (0.1*Rac). A line 1204 represents the frequency response of the output voltage for the degree of coupling k=0.15 and the AC equivalent resistance of the load circuit 27 being (0.01*Rac). The simulation uses the same parameter values as for the circuit elements used in the simulation shown in FIG. 11.

As shown in FIG. 12, when the AC equivalent resistance value of the load circuit 27 is decreased to extremely small values indicated by the lines 1203 and 1204, the output voltage reaches the maximum at the frequency f0, at which the substantially the same output values are observed for the AC equivalent resistances of the load circuit 27 being Rac and (10*Rac). Thus, with a smaller AC equivalent resistance of the load circuit 27, the frequency at which the input impedance reaches the minimum, or more specifically, the current through the transmitter coil 14 reaches the maximum is nearer the frequency f0.

FIG. 13 is a graph showing an example relationship between the frequency response of the output voltage from the contactless power transmission apparatus including the transmitter 2 and the receiver 6 and the frequency response of a phase lag of the current relative to the voltage of the AC power to be applied to the transmitter coil 14. In FIG. 13, the horizontal axis represents the frequency, and the vertical axis represents the phase lag. In the graph, the phase lag with a positive value indicates that the phase of the current is delayed relative to the phase of the voltage. This simulation also uses the same parameter values as for the circuit elements used in the simulation shown in FIG. 11.

A line 1311 represents the frequency response of a phase lag of the current relative to the voltage for the AC power to be applied to the transmitter coil 14, obtained for the degree of coupling k=0.15 and the AC equivalent resistance of the load circuit 27 being Rac. A line 1312 represents the frequency response of a phase lag of the current relative to the voltage for the AC power to be applied to the transmitter coil 14, obtained for the degree of coupling k=0.15 and the AC equivalent resistance of the load circuit 27 being (10*Rac). A line 1313 represents the frequency response of a phase lag of the current relative to the voltage for the AC power to be applied to the transmitter coil 14, obtained for the degree of coupling k=0.15 and the AC equivalent resistance of the load circuit 27 being (0.1*Rac). A line 1314 represents the frequency response of a phase lag of the current relative to the voltage for the AC power to be applied to the transmitter coil 14, obtained for the degree of coupling k=0.15 and the AC equivalent resistance of the load circuit 27 being (0.01*Rac).

As shown in FIG. 13, with a smaller AC equivalent resistance of the load circuit 27, the frequency at which the phase lag of the current relative to the voltage of the AC power to be applied to the transmitter coil 14 is 0 is nearer the frequency f0, at which the contactless power transmission apparatus outputs a constant voltage. In particular, when the AC equivalent resistance of the load circuit 27 is (0.01*Rac), the phase lag of the current relative to the voltage for the AC power to be applied to the transmitter coil 14 at the frequency f0 is substantially 0, or more specifically, the power factor is substantially 1.

Thus, in the contactless power transmission apparatus including the transmitter 2 and the receiver 6 as well, the control circuit 19 in the transmitter 2 simply controls the switching frequency and the voltage of the AC power to be applied to the transmitter coil 14 in the same manner as in the contactless power transmission apparatus 1 shown in FIG. 1. The determination circuit 29 in the receiver 6 also transmits, in the same manner as in the contactless power transmission apparatus 1 shown in FIG. 1, determination information to the transmitter 2 through the communicator 31 and receives detection information from the transmitter 2 to control the relay 30.

In still another modification, two MOSFETs connected in series may be used as a short circuit in place of a relay. In this case, the two MOSFETs may have their source terminals or drain terminals connected to each other. To short-circuit the resonant circuit 20 (or resonant circuit 20a), the determination circuit 29 may apply a voltage to the gate terminals of the two MOSFETs to turn on the MOSFETs. To open the resonant circuit 20 (or resonant circuit 20a), the determination circuit 29 may apply a voltage to the gate terminals of the two MOSFETs to turn on the MOSFETs.

As described above, those skilled in the art can make various changes in accordance with embodiments implemented within the scope of the present invention.

The invention claimed is:

1. A contactless power transmission apparatus, comprising:
   a transmitter; and
   a receiver configured to receive electric power from the transmitter in a contactless manner, wherein:
   the transmitter comprises:
      a transmitter coil configured to supply electric power to the receiver;
      a power supply circuit configured to supply alternating current power having an adjustable switching frequency and an adjustable voltage to the transmitter coil;
      a current detection circuit configured to measure a current through the transmitter coil and determine a measurement value of the current;
      a control circuit configured to control the switching frequency and the voltage of the alternating current power to be supplied to the transmitter coil from the power supply circuit; and
      a first communicator configured to communicate with the receiver;
   the receiver comprises:
      a resonant circuit including a receiver coil configured to receive electric power from the transmitter and a resonant capacitor configured to resonate with the receiver coil in response to electric power from the transmitter;
      a rectifier circuit configured to rectify electric power output from the resonant circuit;
      a short circuit configured to switch between short-circuiting and opening the resonant circuit;

a voltage detection circuit configured to measure an output voltage of electric power output from the resonant circuit and determine a measurement value of the output voltage;

a coil directly connected to and in series with the receiver coil, the coil located between the resonant circuit and the rectifier circuit;

a second communicator configured to communicate with the transmitter; and a determination circuit configured to determine whether the measurement value of the output voltage is within a predetermined allowable range of voltages, and cause the short circuit to short-circuit the resonant circuit and cause the second communicator to transmit determination information indicating that the contactless power transmission apparatus is not outputting a constant voltage in response to the measurement value of the output voltage being out of the predetermined allowable range of voltages; and the control circuit in the transmitter detects, in response to the determination information indicating that the contactless power transmission apparatus is not outputting a constant voltage received from the receiver through the first communicator, a switching frequency of the alternating current power at which the contactless power transmission apparatus outputs a constant voltage in accordance with the measurement value of the current.

2. The contactless power transmission apparatus according to claim 1, wherein the receiver coil and the resonant capacitor in the resonant circuit are connected in parallel, the short circuit has an end connected between the coil and the rectifier circuit, and the determination circuit causes the short circuit to short-circuit the resonant circuit through the coil in response to the measurement value of the output voltage being out of the predetermined allowable range of voltages.

3. The contactless power transmission apparatus according to claim 1, wherein the receiver coil and the resonant capacitor in the resonant circuit are connected in series.

4. The contactless power transmission apparatus according to claim 1, wherein the control circuit in the transmitter determines that the contactless power transmission apparatus outputs a constant voltage at a switching frequency of the alternating current power at which the measurement value of the current is greater than or equal to a predetermined threshold.

5. The contactless power transmission apparatus according to claim 1, wherein the control circuit in the transmitter determines that the contactless power transmission apparatus outputs a constant voltage at a switching frequency of the alternating current power at which an absolute value of a difference between a phase of the measurement value of the current and a phase of the voltage of the alternating current power to be supplied to the transmitter coil is less than or equal to a predetermined threshold.

6. The contactless power transmission apparatus according to claim 1, wherein the control circuit in the transmitter causes, after detecting the switching frequency of the alternating current power at which the contactless power transmission apparatus outputs a constant voltage, the first communicator to transmit detection information indicating the detection of the switching frequency, and the determination circuit in the receiver causes the short circuit to open the resonant circuit after receiving the detection information through the second communicator.

7. The contactless power transmission apparatus according to claim 6, wherein the control circuit in the transmitter controls, after causing the first communicator to transmit the detection information, the power supply circuit to regulate the voltage of the alternating current power to be supplied to the transmitter coil to a voltage at which the contactless power transmission apparatus outputs a constant voltage.

8. The contactless power transmission apparatus according to claim 2, wherein the control circuit in the transmitter determines that the contactless power transmission apparatus outputs a constant voltage at a switching frequency of the alternating current power at which the measurement value of the current is greater than or equal to a predetermined threshold.

9. The contactless power transmission apparatus according to claim 2, wherein the control circuit in the transmitter determines that the contactless power transmission apparatus outputs a constant voltage at a switching frequency of the alternating current power at which an absolute value of a difference between a phase of the measurement value of the current and a phase of the voltage of the alternating current power to be supplied to the transmitter coil is less than or equal to a predetermined threshold.

10. The contactless power transmission apparatus according to claim 3, wherein the control circuit in the transmitter determines that the contactless power transmission apparatus outputs a constant voltage at a switching frequency of the alternating current power at which the measurement value of the current is greater than or equal to a predetermined threshold.

11. The contactless power transmission apparatus according to claim 3, wherein the control circuit in the transmitter determines that the contactless power transmission apparatus outputs a constant voltage at a switching frequency of the alternating current power at which an absolute value of a difference between a phase of the measurement value of the current and a phase of the voltage of the alternating current power to be supplied to the transmitter coil is less than or equal to a predetermined threshold.

12. The contactless power transmission apparatus according to claim 2, wherein the control circuit in the transmitter causes, after detecting the switching frequency of the alternating current power at which the contactless power transmission apparatus outputs a constant voltage, the first communicator to transmit detection information indicating the detection of the switching frequency, and the determination circuit in the receiver causes the short circuit to open the resonant circuit after receiving the detection information through the second communicator.

13. The contactless power transmission apparatus according to claim 3, wherein
the control circuit in the transmitter causes, after detecting the switching frequency of the alternating current power at which the contactless power transmission apparatus outputs a constant voltage, the first communicator to transmit detection information indicating the detection of the switching frequency, and
the determination circuit in the receiver causes the short circuit to open the resonant circuit after receiving the detection information through the second communicator.

14. The contactless power transmission apparatus according to claim 4, wherein
the control circuit in the transmitter causes, after detecting the switching frequency of the alternating current power at which the contactless power transmission apparatus outputs a constant voltage, the first communicator to transmit detection information indicating the detection of the switching frequency, and
the determination circuit in the receiver causes the short circuit to open the resonant circuit after receiving the detection information through the second communicator.

15. The contactless power transmission apparatus according to claim 5, wherein
the control circuit in the transmitter causes, after detecting the switching frequency of the alternating current power at which the contactless power transmission apparatus outputs a constant voltage, the first communicator to transmit detection information indicating the detection of the switching frequency, and
the determination circuit in the receiver causes the short circuit to open the resonant circuit after receiving the detection information through the second communicator.

\* \* \* \* \*